(12) United States Patent
Akkarakaran et al.

(10) Patent No.: US 11,706,720 B2
(45) Date of Patent: Jul. 18, 2023

(54) INITIAL ACCESS AND COMMUNICATION HANDLING FOR HIGH DYNAMIC RANGE POWER INPUTS AT A RECEIVER

(71) Applicant: QUALCOMM Incorporated, San Diego, CA (US)

(72) Inventors: Sony Akkarakaran, Poway, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 17/175,109

(22) Filed: Feb. 12, 2021

(65) Prior Publication Data

US 2022/0264477 A1    Aug. 18, 2022

(51) Int. Cl.
*H04W 52/02*    (2009.01)
*H04W 52/28*    (2009.01)
*H04W 74/08*    (2009.01)

(52) U.S. Cl.
CPC ....... *H04W 52/288* (2013.01); *H04W 52/283* (2013.01); *H04W 74/08* (2013.01)

(58) Field of Classification Search
CPC ............ H04W 74/0833; H04W 72/042; H04L 5/0053; H04L 5/0048
See application file for complete search history.

(56) References Cited

U.S. PATENT DOCUMENTS

2009/0305736 A1* 12/2009 Omori ................... H04W 52/50
455/522
2020/0022082 A1* 1/2020 Ljung ............... H04W 52/0229

* cited by examiner

*Primary Examiner* — Jamal Javaid
(74) *Attorney, Agent, or Firm* — Harrity & Harrity, LLP

(57) ABSTRACT

Various aspects of the present disclosure generally relate to wireless communication. In some aspects, a user equipment (UE) may receive, from a wireless communication device, an acquisition signal that uses a lower transmit power level than a transmit power level of one or more other acquisition signals transmitted by the wireless communication device. The UE may transmit, to the wireless communication device, a response message to the acquisition signal that uses an initial access power configuration associated with the acquisition signal, the response message indicating at least one low power capability of the UE or location information of the UE. The UE may communicate, with the wireless communication device, in a connected communication mode using a low power configuration that is based at least in part on the at least one low power capability of the UE or the location information of the UE. Numerous other aspects are described.

30 Claims, 10 Drawing Sheets

INITIAL ACCESS AND COMMUNICATION HANDLING FOR HIGH DYNAMIC RANGE POWER INPUTS AT A RECEIVER

FIELD OF THE DISCLOSURE

Aspects of the present disclosure generally relate to wireless communication and to techniques and apparatuses for initial access and communication handling for high dynamic range inputs at a receiver.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory. The memory and the one or more processors may be configured to: receive, from a wireless communication device, an acquisition signal that uses a lower transmit power level than a transmit power level of one or more other acquisition signals transmitted by the wireless communication device; transmit, to the wireless communication device, a response message to the acquisition signal, that uses an initial access power configuration associated with the acquisition signal, the response message indicating at least one low power capability of the UE or location information of the UE; and communicate, with the wireless communication device, in a connected communication mode using a low power configuration that is based at least in part on the at least one low power capability of the UE or the location information of the UE.

In some aspects, a wireless communication device for wireless communication includes a memory and one or more processors operatively coupled to the memory. The memory and the one or more processors may be configured to: transmit a set of acquisition signals that includes a first subset of acquisition signals having a first transmit power level and a second subset of acquisition signals having a second transmit power level that is less than the first transmit power level; receive, from a UE, a response message, that uses an initial access power configuration associated with an acquisition signal included in the second subset of acquisition signals, the response message indicating at least one low power capability of the UE or location information of the UE; and communicate, with the UE, in a connected communication mode using a low power configuration that is based at least in part on the at least one low power capability of the UE or the location information of the UE.

In some aspects, a method of wireless communication performed by a UE includes receiving, from a wireless communication device, an acquisition signal that uses a lower transmit power level than a transmit power level of one or more other acquisition signals transmitted by the wireless communication device; transmitting, to the wireless communication device, a response message to the acquisition signal, that uses an initial access power configuration associated with the acquisition signal, the response message indicating at least one low power capability of the UE or location information of the UE; and communicating, with the wireless communication device, in a connected communication mode using a low power configuration that is based at least in part on the at least one low power capability of the UE or the location information of the UE.

In some aspects, a method of wireless communication performed by a wireless communication device includes transmitting a set of acquisition signals that includes a first subset of acquisition signals having a first transmit power level and a second subset of acquisition signals having a second transmit power level that is less than the first transmit power level; receiving, from a UE, a response message, that uses an initial access power configuration associated with an acquisition signal included in the second subset of acquisition signals, the response message indicating at least one power capability of the UE or location information of the UE; and communicating, with the UE, in a connected communication mode using a low power configuration that is based at least in part on the at least one low power capability of the UE or the location information of the UE.

In some aspects, a non-transitory computer-readable medium storing a set of instructions for wireless communication includes one or more instructions that, when executed by one or more processors of a UE, cause the UE to: receive, from a wireless communication device, an acquisition signal that uses a lower transmit power level than a transmit power level of one or more other acquisition signals transmitted by the wireless communication device; transmit, to the wireless communication device, a response message to the acquisition signal, that uses an initial access power configuration associated with the acquisition signal, the response message indicating at least one low power capability of the UE or location information of the UE; and communicate, with the wireless communication device, in a connected communication mode using a low power configuration that is based at least in part on the at least one low power capability of the UE or the location information of the UE.

In some aspects, a non-transitory computer-readable medium storing a set of instructions for wireless communication includes one or more instructions that, when executed by one or more processors of a wireless communication device, cause the wireless communication device to: transmit a set of acquisition signals that includes a first subset of acquisition signals having a first transmit power level and a second subset of acquisition signals having a second transmit power level that is less than the first transmit power level; receive, from a UE, a response message, that uses an initial access power configuration associated with an acquisition signal included in the second subset of acquisition signals, the response message indicating at least one power capability of the UE or location information of the UE; and communicate, with the UE, in a connected communication mode using a low power configuration that is based at least in part on the at least one low power capability of the UE or the location information of the UE.

In some aspects, an apparatus for wireless communication includes means for receiving, from a wireless communication device, an acquisition signal that uses a lower transmit power level than a transmit power level of one or more other acquisition signals transmitted by the wireless communication device; means for transmitting, to the wireless communication device, a response message to the acquisition signal, that uses an initial access power configuration associated with the acquisition signal, the response message indicating at least one low power capability of the apparatus or location information of the apparatus; and means for communicating, with the wireless communication device, in a connected communication mode using a low power configuration that is based at least in part on the at least one low power capability of the apparatus or the location information of the apparatus.

In some aspects, an apparatus for wireless communication includes means for transmitting a set of acquisition signals that includes a first subset of acquisition signals having a first transmit power level and a second subset of acquisition signals having a second transmit power level that is less than the first transmit power level; means for receiving, from a UE, a response message, that uses an initial access power configuration associated with an acquisition signal included in the second subset of acquisition signals, the response message indicating at least one power capability of the UE or location information of the UE; and means for communicating, with the UE, in a connected communication mode using a low power configuration that is based at least in part on the at least one low power capability of the UE or the location information of the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
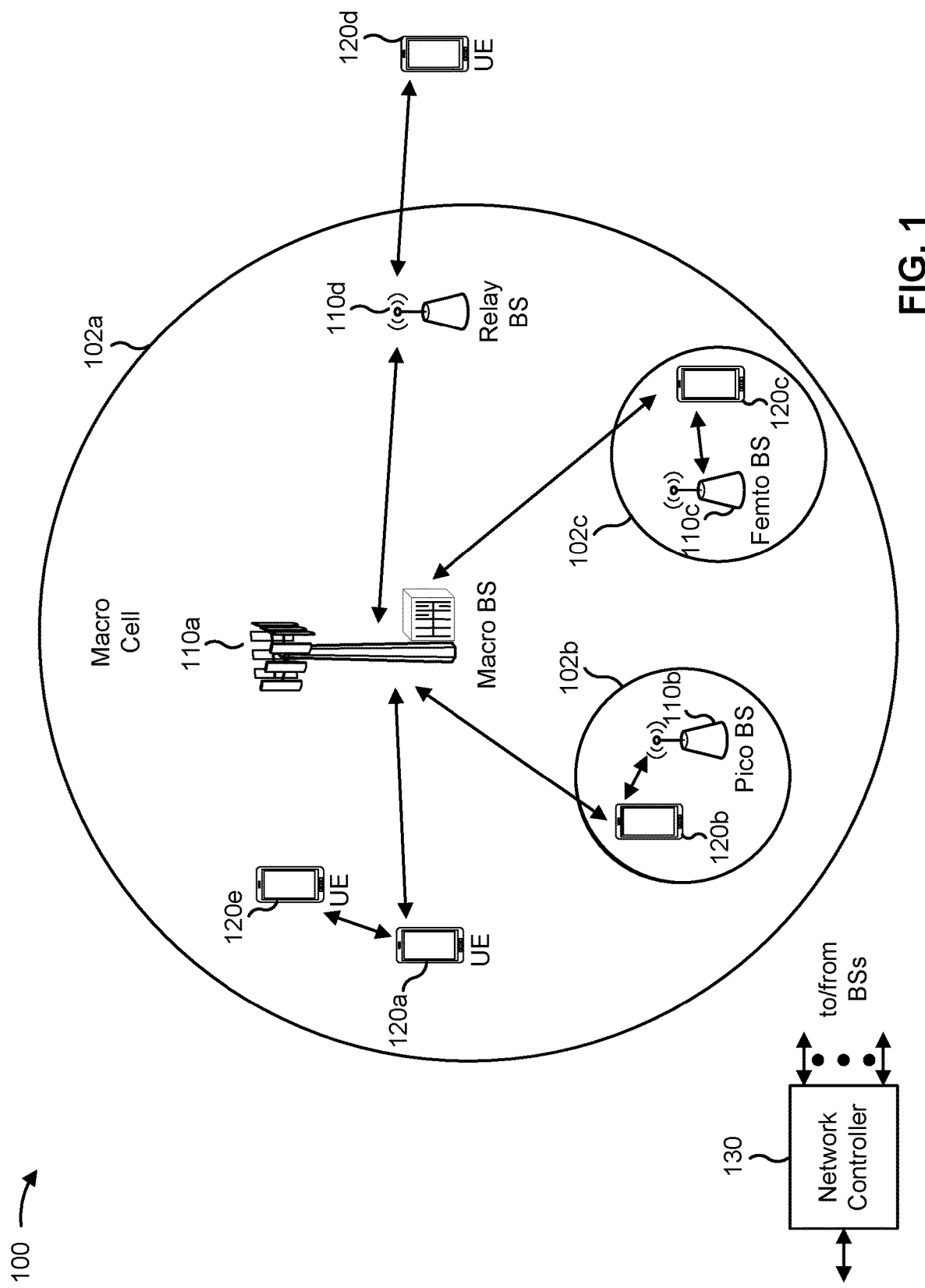
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
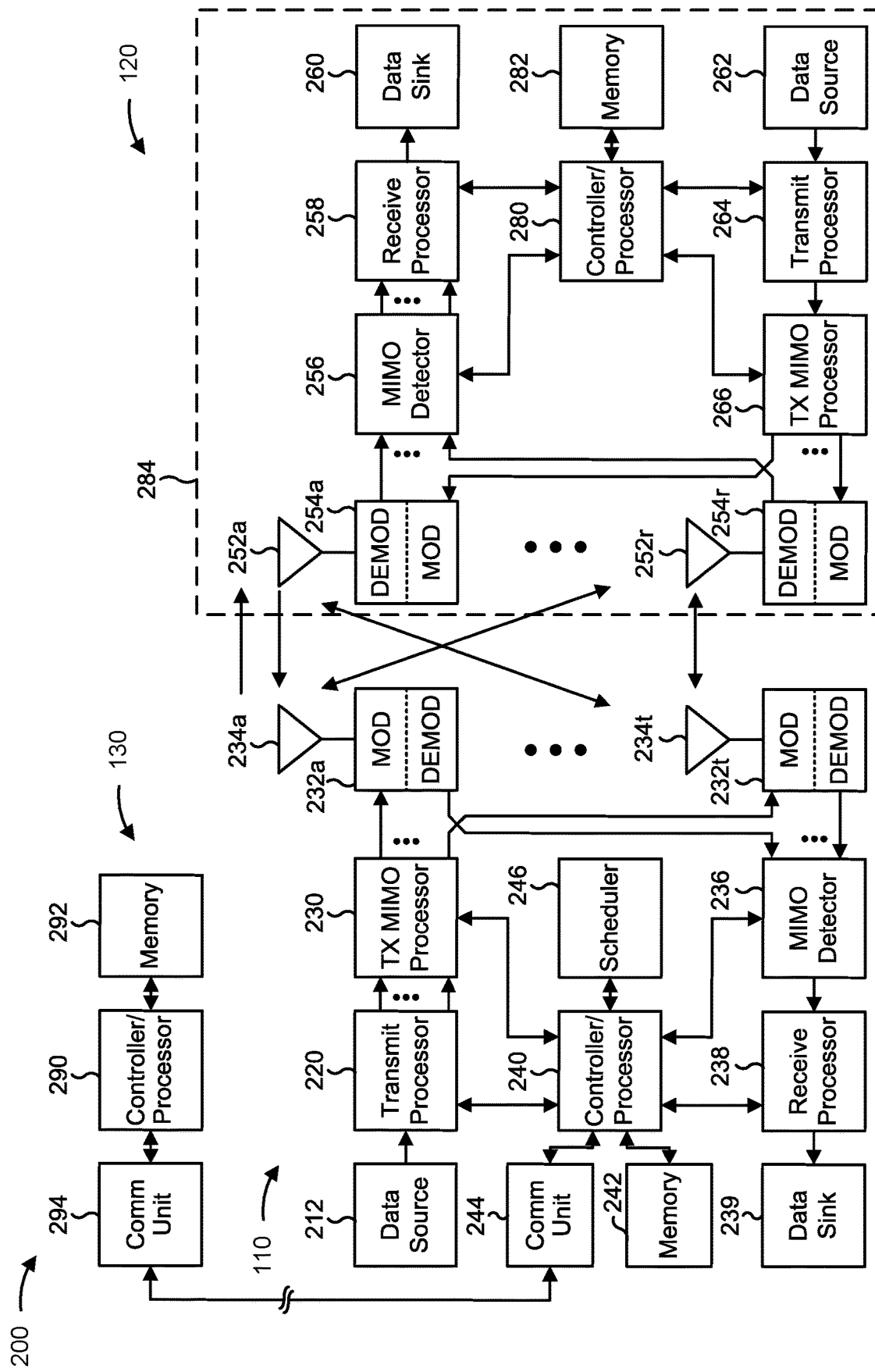
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-8).

Controller/processor 240 of base station 110, controller/processor 280 of UE 120, and/or any other component(s) of FIG. 2 may perform one or more techniques associated with initial access and communication handling for high dynamic range inputs at a receiver, as described in more detail elsewhere herein. In some aspects, the wireless communication device described herein is the base station 110, is included in the base station 110, or includes one or more components of the base station 110 shown in FIG. 2. In some aspects, the wireless communication device described herein is the UE 120, is included in the UE 120, or includes one or more components of the UE 120 shown in FIG. 2.

Figure 7:
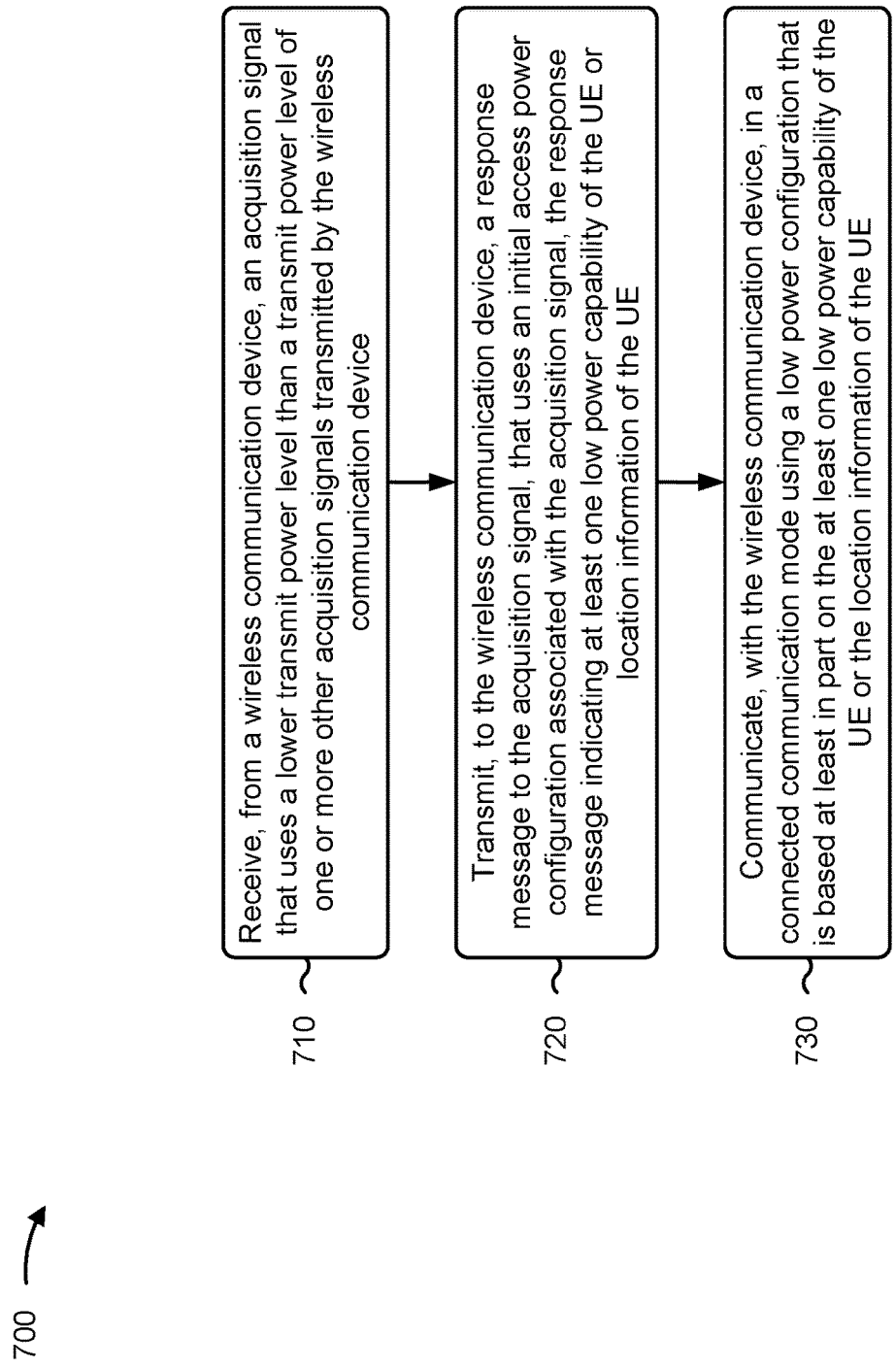
FIGS. 7 and 8 are diagrams illustrating example processes associated with initial access and communication handling for high dynamic range inputs at a receiver, in accordance with the present disclosure.
Figure 8:
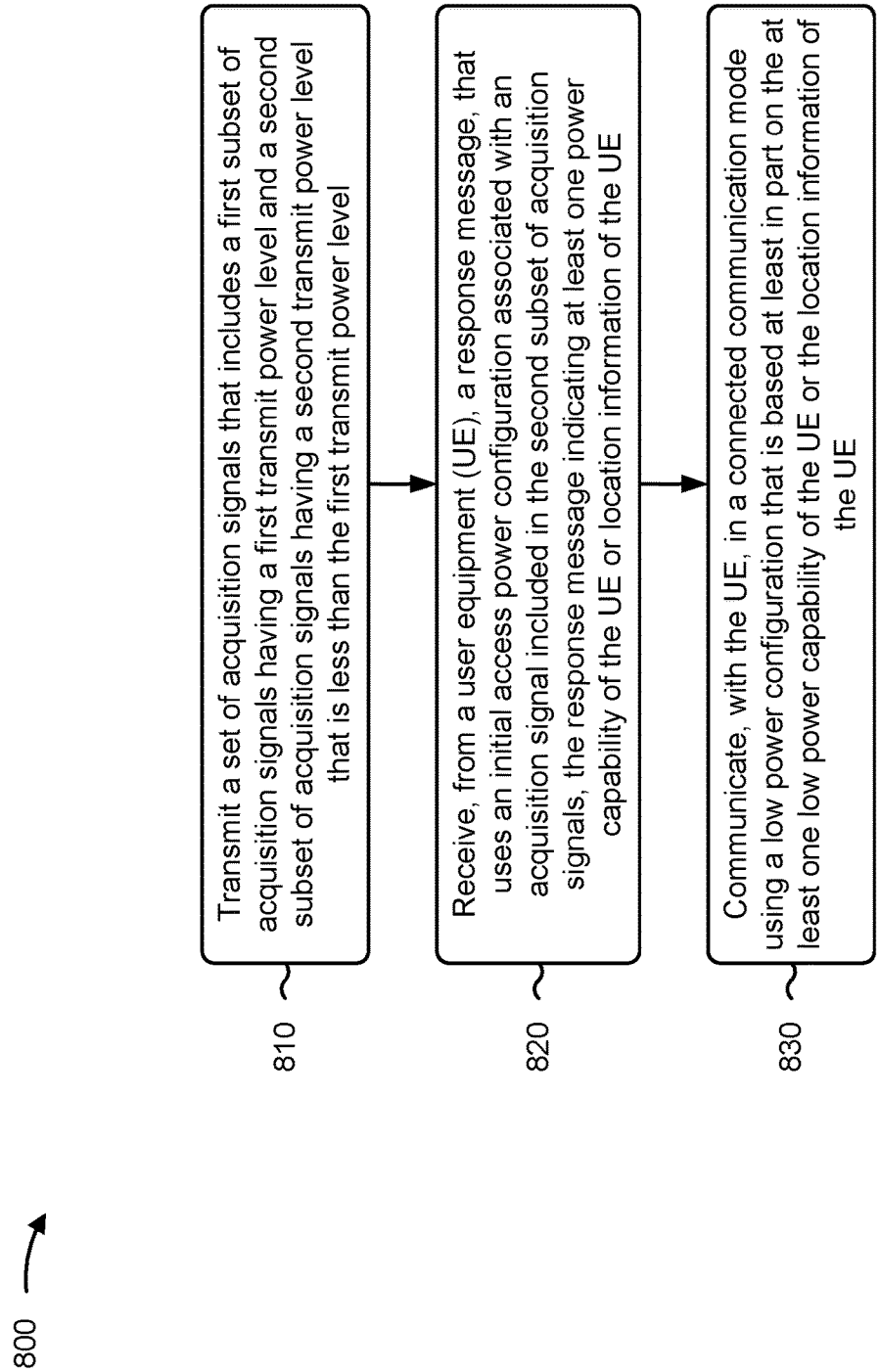

For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, the UE 120 includes means for receiving, from a wireless communication device, an acquisition signal that uses a lower transmit power level than a transmit power level of one or more other acquisition signals transmitted by the wireless communication device; means for transmitting, to the wireless communication device, a response message to the acquisition signal, that uses an initial access power configuration associated with the acquisition signal, the response message indicating at least one low power capability of the UE or location information of the UE; and/or means for communicating, with the wireless communication device, in a connected communication mode using a low power configuration that is based at least in part on the at least one low power capability of the UE or the location information of the UE. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for receiving an indication of a random access channel occasion associated with the acquisition signal and the initial access power configuration associated with the random access channel occasion, means for transmitting, during the random access channel occasion, the response message using the initial access power configuration.

In some aspects, the UE 120 includes means for receiving an indication of the low power configuration and a different power configuration, the different power configuration being associated with a higher transmit power level than a transmit power level of the low power configuration; and/or means for receiving an indication of one or more trigger events indicating when the UE is to switch from using the low power configuration to using the different power configuration.

In some aspects, the UE 120 includes means for receiving an indication of at least one of: a first closed loop power control parameter for the low power configuration and a second closed loop power control parameter for the different power configuration, a beamforming configuration for communications to be transmitted by the UE when using the low power configuration, or a sounding reference signal (SRS) configuration for uplink beam sweeping to be used by the UE when using the low power configuration.

In some aspects, the UE 120 includes means for transmitting an indication of the at least one low power capability of the UE or the location information of the UE that includes at least one of: a minimum transmit power level of the UE, a beamforming capability of the UE, an input range of an analog to digital converter of the UE, movement information of the UE, or location information of the UE, where the indication of one or more low power capabilities of the UE or the location information of the UE is explicitly indicated in the response message or implicitly indicated based at least in part on a random access channel occasion used to transmit the response message.

In some aspects, the wireless communication device includes means for transmitting a set of acquisition signals that includes a first subset of acquisition signals having a first transmit power level and a second subset of acquisition signals having a second transmit power level that is less than the first transmit power level; means for receiving, from a UE, a response message, that uses an initial access power configuration associated with an acquisition signal included in the second subset of acquisition signals, the response message indicating at least one power capability of the UE or location information of the UE; and/or means for communicating, with the UE, in a connected communication mode using a low power configuration that is based at least in part on the at least one low power capability of the UE or the location information of the UE. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless communication device includes means for transmitting the second subset of acquisition signals in an omni-directional transmission or without performing beam refinement.

In some aspects, the wireless communication device includes means for refraining from scheduling a first message that is to be frequency division multiplexed with an acquisition signal, included in the second subset of acquisition signals, unless the first message uses the second transmit power level or a transmit power level that is within a first threshold amount of the second transmit power level; and/or means for refraining from scheduling a second message that is to be frequency division multiplexed with the response message unless the second message uses a transmit power level that is the same as, or is within a second threshold amount of, a transmit power level associated with the initial access power configuration.

In some aspects, the wireless communication device includes means for transmitting the second subset of acquisition signals including a third subset of acquisition signals, from the second subset of acquisition signals, and a fourth subset of acquisition signals, from the second subset of acquisition signals, wherein the third subset of acquisition signals and the fourth subset of acquisition signals are transmitted using different transmit power levels.

In some aspects, the wireless communication device includes means for transmitting, to the UE, an indication of one or more trigger events indicating when the UE is to switch from using the low power configuration to using a different power configuration, wherein the one or more trigger events include at least one of: a minimum transmit power level of the UE, a beamforming capability of the UE, an input range of an analog to digital converter of the UE, movement information of the UE, or location information of the UE.

In some aspects, the wireless communication device includes means for transmitting, to the UE, one or more signals that use a transmit power level that is based at least in part on the at least one low power capability of the UE or the location information of the UE; and/or means for receiving, from the UE, one or more signals that are transmitted by the UE using a transmit power level that is based at least in part on the at least one low power capability of the UE or the location information of the UE.

In some aspects, the wireless communication device includes means for transmitting the first subset of acquisition signals that are associated with a first set of random access channel (RACH) occasions, wherein the first set of RACH occasions are associated with a first initial access power configuration to be used by the UE; and/or means for transmitting the second subset of acquisition signals that are associated with a second set of RACH occasions, wherein the second set of RACH occasions are associated with a second initial access power configuration to be used by the UE, wherein the second initial access power configuration is associated with a lower transmit power level than a transmit power level associated with the first initial access power configuration, and means for receiving the response message that is transmitted by the UE using the second initial access power configuration.

In some aspects, the wireless communication device includes means for determining the low power configuration for the UE based at least in part on the at least one low power capability of the UE or the location information of the UE; and/or means for transmitting, to the UE, an indication of the low power configuration.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
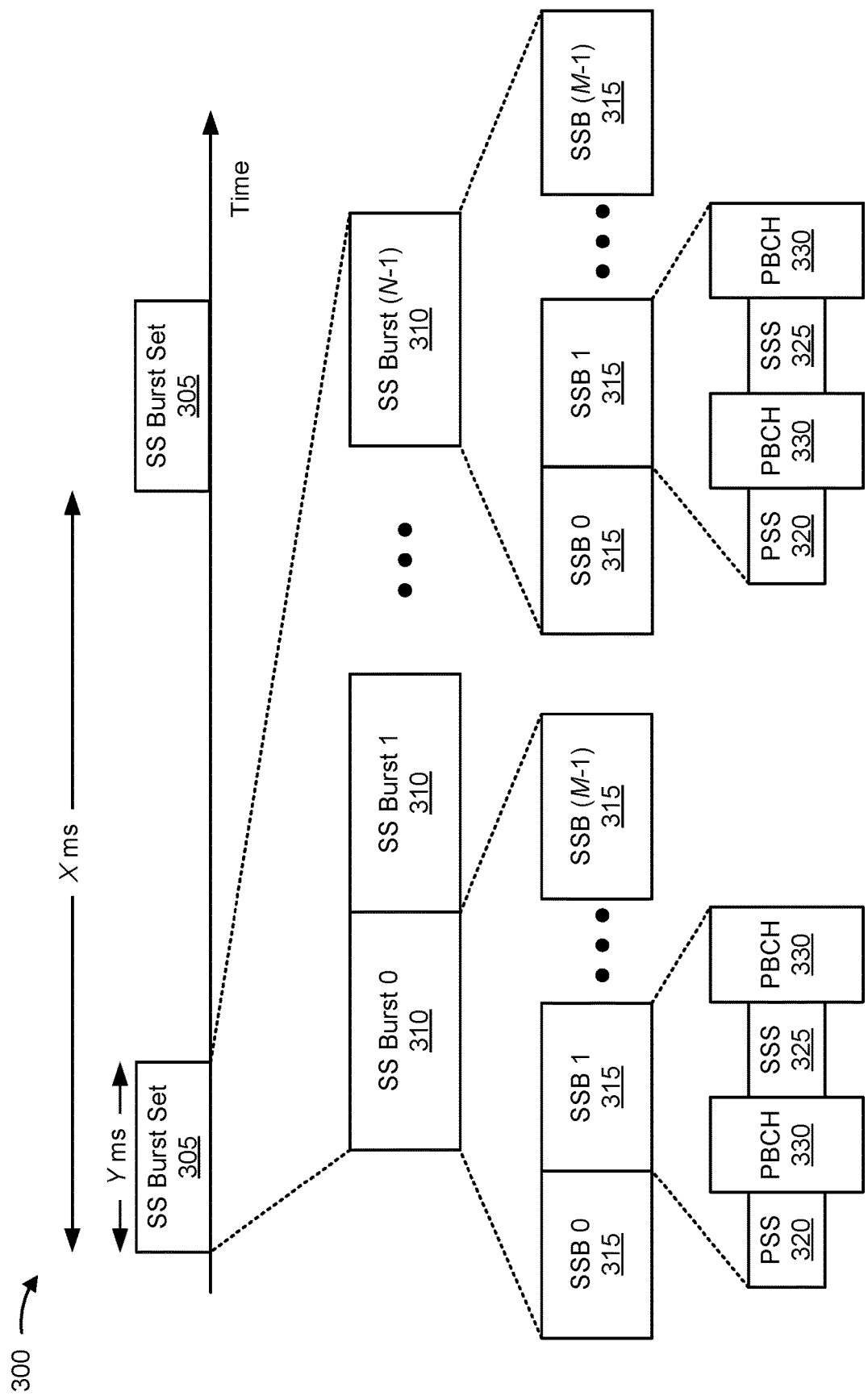
FIG. 3 is a diagram illustrating an example of a synchronization signal (SS) hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which may include multiple SS bursts 310, shown as SS burst 0 through SS burst N−1, where N is a maximum number of repetitions of the SS burst 310 that may be transmitted by the base station. As further shown, each SS burst 310 may include one or more SS blocks (SSBs) 315, shown as SSB 0 through SSB M−1, where M is a maximum number of SSBs 315 that can be carried by an SS burst 310. In some aspects, different SSBs 315 may be beam-formed differently (e.g., transmitted using different beams), and may be used for cell search, cell acquisition, beam management, and/or beam selection (e.g., as part of an initial network access procedure). An SS burst set 305 may be periodically transmitted by a wireless node (e.g., base station 110), such as every X milliseconds, as shown in FIG. 3. In some aspects, an SS burst set 305 may have a fixed or dynamic length, shown as Y milliseconds in FIG. 3. In some cases, an SS burst set 305 or an SS burst 310 may be referred to as a discovery reference signal (DRS) transmission window or an SSB measurement time configuration (SMTC) window.

In some aspects, an SSB 315 may include resources that carry a primary synchronization signal (PSS) 320, a secondary synchronization signal (SSS) 325, and/or a physical broadcast channel (PBCH) 330. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some aspects, the SS bursts 310 may have a burst period, and the SSBs 315 of the SS burst 310 may be transmitted by a wireless node (e.g., base station 110) according to the burst period. In this case, the SSBs 315 may be repeated during each SS burst 310. In some aspects, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some aspects, an SSB 315 may include an SSB index, which may correspond to a beam used to carry the SSB 315. A UE 120 may monitor for and/or measure SSBs 315 using different receive (Rx) beams during an initial network access procedure and/or a cell search procedure, among other examples. Based at least in part on the monitoring and/or measuring, the UE 120 may indicate one or more SSBs 315 with a best signal parameter (e.g., a reference signal received power (RSRP) parameter) to a base station 110. The base station 110 and the UE 120 may use the one or more indicated SSBs 315 to select one or more beams to be used for communication between the base station 110 and the UE 120 (e.g., for a random access channel (RACH) procedure). Additionally, or alternatively, the UE 120 may use the SSB 315 and/or the SSB index to determine a cell timing for a cell via which the SSB 315 is received (e.g., a serving cell).

As indicated above, FIG. 3 is provided as an example. Other examples may differ from what is described with regard to FIG. 3.

Figure 4:
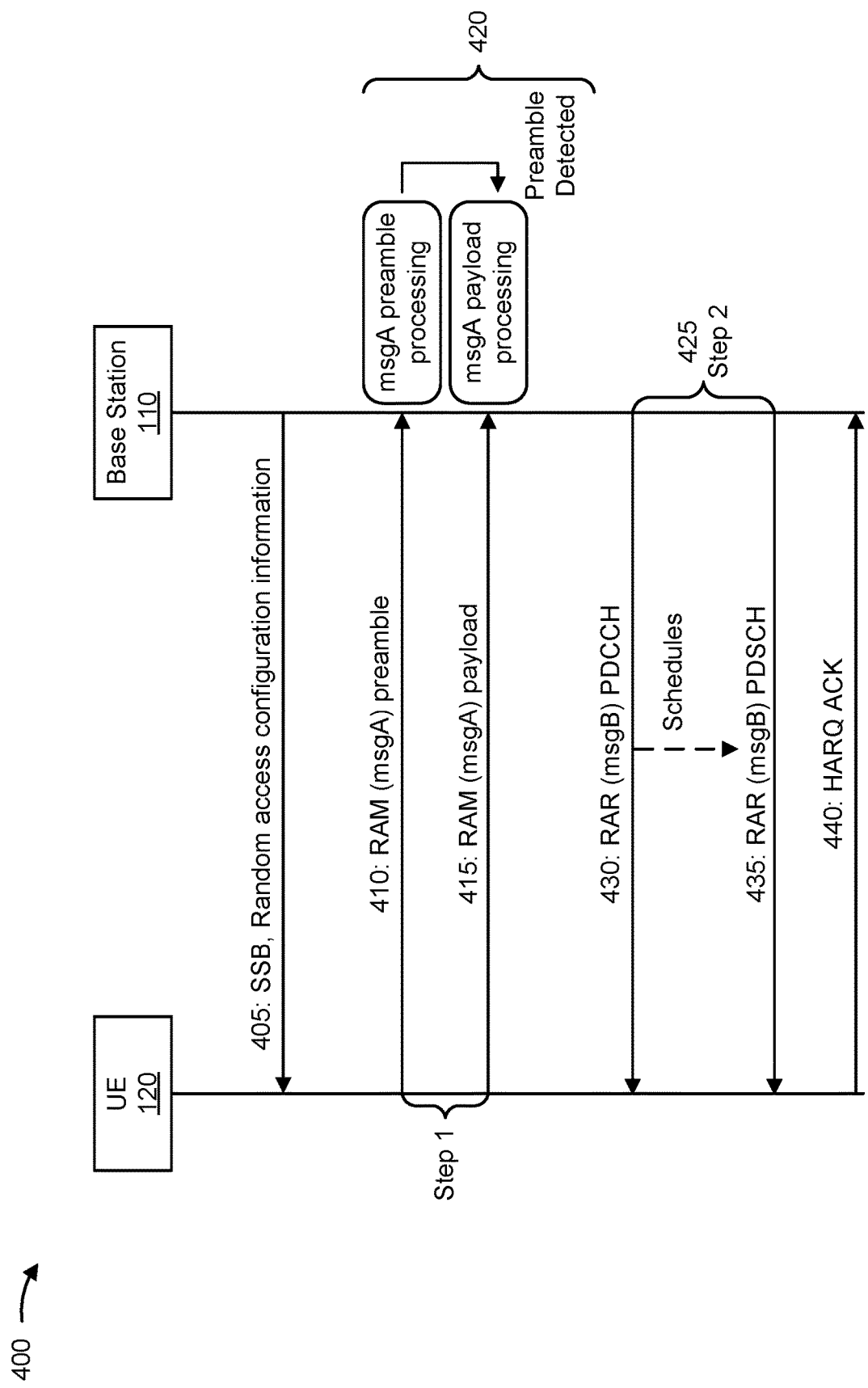
FIG. 4 is a diagram illustrating an example of a two-step random access procedure, in accordance with the present disclosure.

FIG. 4 is a diagram illustrating an example 400 of a two-step random access procedure, in accordance with the present disclosure. As shown in FIG. 4, a base station 110 and a UE 120 may communicate with one another to perform the two-step random access procedure (e.g., a two-step RACH procedure).

As shown by reference number 405, the base station 110 may transmit, and the UE 120 may receive, one or more SSBs and random access configuration information. In some aspects, the random access configuration information may be transmitted in and/or indicated by system information (e.g., in one or more system information blocks (SIBs)) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the two-step random access procedure, such as one or more parameters for transmitting a random access message (RAM) and/or receiving a random access response (RAR) to the RAM.

As shown by reference number 410, the UE 120 may transmit, and the base station 110 may receive, a RAM preamble. As shown by reference number 415, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, or an initial message in a two-step random access procedure. Furthermore, in some aspects, the RAM preamble may be referred to as a message A preamble, a msgA preamble, a preamble, or a physical random access channel (PRACH) preamble, and the RAM payload may be referred to as a message A payload, a msgA payload, or a payload. In some aspects, the RAM may include some or all of the contents of message 1 (msg1) and message 3 (msg3) of a four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), and/or a physical uplink shared channel (PUSCH) transmission).

As shown by reference number 420, the base station 110 may receive the RAM preamble transmitted by the UE 120. If the base station 110 successfully receives and decodes the RAM preamble, the base station 110 may then receive and decode the RAM payload.

As shown by reference number 425, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, and/or contention resolution information.

As shown by reference number 430, as part of the second step of the two-step random access procedure, the base station 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 435, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 440, if the UE 120 successfully receives the RAR, the UE 120 may transmit a hybrid automatic repeat request (HARQ) acknowledgement (ACK).

As indicated above, FIG. 4 is provided as an example. Other examples may differ from what is described with regard to FIG. 4.

Figure 5:
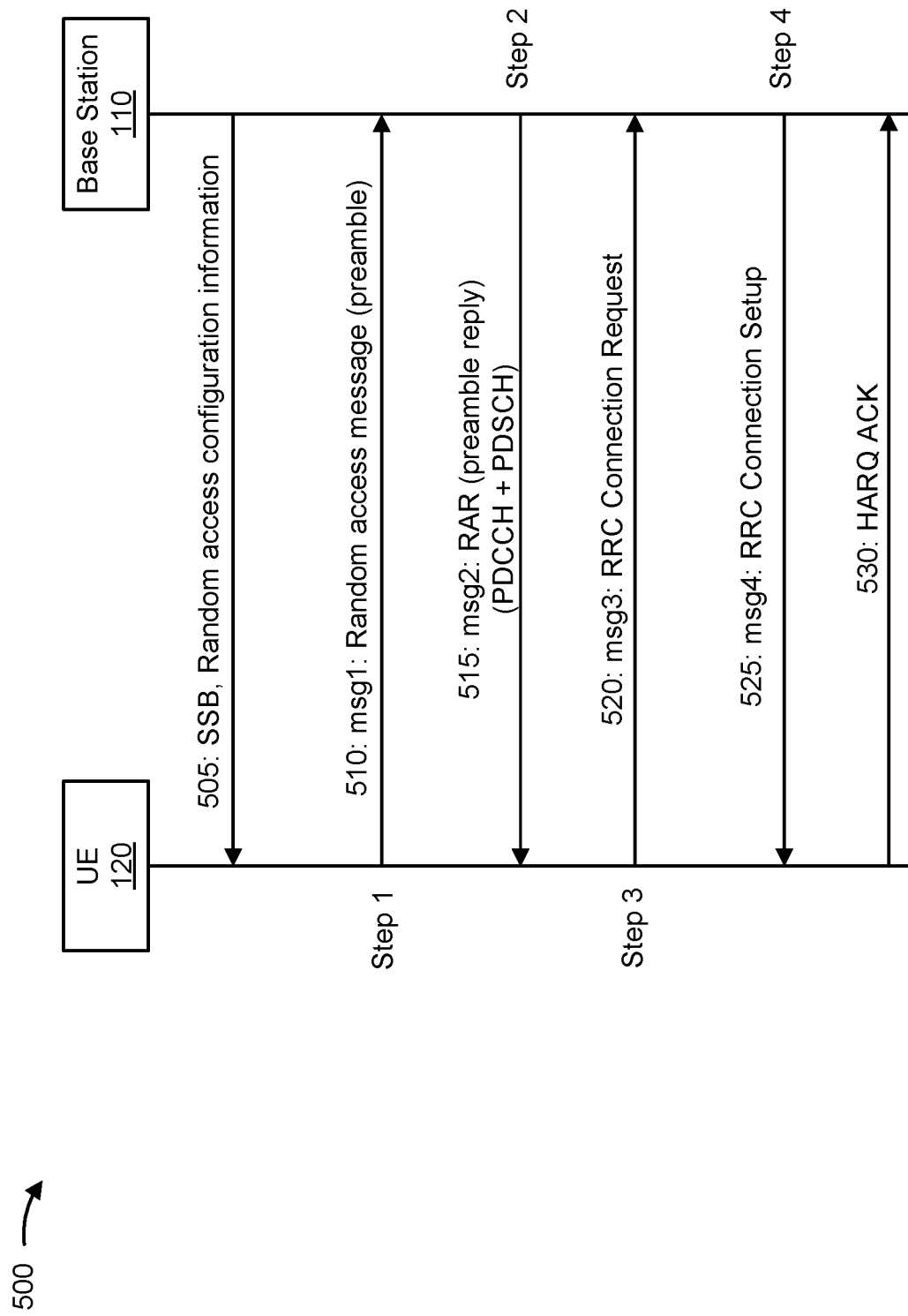
FIG. 5 is a diagram illustrating an example of a four-step random access procedure, in accordance with the present disclosure.

FIG. 5 is a diagram illustrating an example 500 of a four-step random access procedure, in accordance with the present disclosure. As shown in FIG. 5, a base station 110 and a UE 120 may communicate with one another to perform the four-step random access procedure (e.g., a four-step RACH procedure).

As shown by reference number 505, the base station 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the random access procedure, such as one or more parameters for transmitting a RAM and/or one or more parameters for receiving an RAR.

As shown by reference number 510, the UE 120 may transmit a RAM, which may include a preamble (sometimes referred to as a random access preamble, a PRACH preamble, or a RAM preamble). The message that includes the preamble may be referred to as a message 1, msg1, MSG1, a first message, or an initial message in a four-step random access procedure. The random access message may include a random access preamble identifier.

As shown by reference number 515, the base station 110 may transmit an RAR as a reply to the preamble. The message that includes the RAR may be referred to as message 2, msg2, MSG2, or a second message in a four-step random access procedure. In some aspects, the RAR may indicate the detected random access preamble identifier (e.g., received from the UE 120 in msg1). Additionally, or alternatively, the RAR may indicate a resource allocation to be used by the UE 120 to transmit message 3 (msg3).

In some aspects, as part of the second step of the four-step random access procedure, the base station 110 may transmit a PDCCH communication for the RAR. The PDCCH communication may schedule a PDSCH communication that includes the RAR. For example, the PDCCH communication may indicate a resource allocation for the PDSCH communication. Also, as part of the second step of the four-step random access procedure, the base station 110 may transmit the PDSCH communication for the RAR, as scheduled by the PDCCH communication. The RAR may be included in a MAC PDU of the PDSCH communication.

As shown by reference number 520, the UE 120 may transmit an RRC connection request message. The RRC connection request message may be referred to as message 3, msg3, MSG3, or a third message of a four-step random access procedure. In some aspects, the RRC connection request may include a UE identifier, UCI, and/or a PUSCH communication (e.g., an RRC connection request).

As shown by reference number 525, the base station 110 may transmit an RRC connection setup message. The RRC connection setup message may be referred to as message 4, msg4, MSG4, or a fourth message of a four-step random access procedure. In some aspects, the RRC connection setup message may include the detected UE identifier, a timing advance value, and/or contention resolution information. As shown by reference number 530, if the UE 120 successfully receives the RRC connection setup message, the UE 120 may transmit a HARQ ACK.

As indicated above, FIG. 5 is provided as an example. Other examples may differ from what is described with regard to FIG. 5.

In some cases, a receiving device, such as a UE or a base station, attempting to receive a signal for a particular slot may perform automatic gain control (AGC), which refers to mechanisms to tune or otherwise configure a radio frequency front end (RFFE) and/or other receive components of the receiving device to match the received signal power and thereby prevent the receive components from becoming saturated. As used herein, "front end components" may refer to the RFFE components and/or the other receive components, such as an analog-to-digital converter, of a receiving device. For example, AGC may be implemented using one or more circuits (e.g., a closed-loop feedback regulating circuit) to maintain a stable signal level at an output stage regardless of variations in the signal level at an input stage. "Saturation" may refer to a scenario in which an input power level (or an input voltage) to a component exceeds or is outside of an acceptable input power range (or an acceptable input voltage range) of the component. Saturation of front end components of the receiving device results in signal degradation and/or signal distortion at the receiving device, thereby decreasing communication performance of the receiving device.

For example, an analog-to-digital converter (ADC) of the receiving device may be associated with a resolution and/or an ADC power bandwidth or bitwidth (e.g., a range of acceptable power levels of input signals, outside of which the ADC may become saturated). For example, if a signal is received that is below the range of acceptable power levels of input signals for the ADC, then the receiving device (e.g., the ADC) may not detect the signal and may fail to receive the signal. If a signal is received that is above or that exceeds the range of acceptable power levels of input signals for the ADC, then the ADC may become saturated and the receiving device may be unable to receive the signal and/or any other signals while the ADC is saturated.

In some cases, the receiver device may be equipped with front end components (e.g., an ADC or other components) that have a range of acceptable power levels of input signals corresponding to a range of expected power levels for input signals to the receiver device. For example, a base station may be equipped with an ADC that has a range of acceptable power levels of input signals for the ADC corresponding to expected power levels from UEs included in the cell associated with the base station and/or from UEs included in one or more neighbor cells (e.g., cells located proximate to the cell of the base station). As described above, an unexpected power level of a signal (e.g., that is outside of the range of acceptable power levels of input signals for the ADC) may cause the receiver device (e.g., the base station or the UE) to fail to receive the signal and/or any other signals that overlap in time with the signal (e.g., any other concurrent signals).

As described above, front end components of a base station may be designed or selected assuming a minimum possible distance between the base station and the nearest UE (e.g., that could transmit signals to the base station). For example, in some cases, a base station (e.g., antennas of a base station) may be mounted above ground level (e.g., on a tower or on a building), such that UEs or other transmitting devices are expected to be at or near ground level and are not expected to be nearby the base station (e.g., the antennas of the base station). However, in some cases, a UE or other transmitting device may be closer to the base station than the expected (or planned for) minimum distance. As a result, the base station may receive signals from the UE or other transmitting device that cause front end components (e.g., an ADC) of the base station to become saturated. Additionally, or alternatively, the UE or other transmitting device may receive signals from the base station that cause an RFFE component (e.g., an ADC) of the UE or other transmitting device to become saturated.

For example, a UE may be, or may be included in, a drone or other unmanned aerial vehicle (UAV). Therefore, the UE may be capable of communicating while above ground level (e.g., and while near the antenna(s) of the base station). For example, the drone or UAV may be flying nearby the antenna(s) of the base station. The UE may be communicating using the same operating frequency band as the base station. As another example, the UE and/or the base station may have a reduced capability and/or may be equipped with an ADC having a reduced or small acceptable input power range (or an acceptable input voltage range). Therefore, the minimum acceptable distance between the UE and the base station (e.g., to avoid saturation) may be a larger distance (e.g., such that the UE may be on ground level or in areas in which UEs typically travel).

For example, the UE may be a reduced capability UE (RedCap UE). For example, the base station may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category, and may be referred to as a reduced capability (RedCap) UE, a low tier UE, and/or an NR-Lite UE, among other examples. A RedCap UE may be, for example, an MTC UE, an eMTC UE, and/or an IoT UE, as described above in connection with FIG. 1. For example, RedCap UEs may support a lower maximum modulation and coding scheme (MCS) than UEs of the second category (e.g., quadrature phase shift keying (QPSK) or the like as compared to 256-quadrature amplitude modulation (QAM) or the like), may support a lower maximum transmit power than UEs of the second category, may have a less advanced beamforming capability than UEs of the second category (e.g., may not be capable of forming as many beams as UEs of the second category), may require a longer processing time than UEs of the second category, may include less hardware than UEs of the second category (e.g., fewer antennas, fewer transmit antennas, and/or fewer receive antennas), and/or may not be capable of communicating on as wide of a maximum bandwidth part as UEs of the second category, among other examples. Therefore, the minimum acceptable distance between a RedCap UE and the base station (e.g., to avoid saturation) may be a larger distance than if the UE were a UE of the second category (e.g., a baseline UE) because a RedCap UE may experience saturation at a lower input power due to having an ADC with a lower acceptable input range, for example. Additionally, or alternatively, the base station may have reduced capabilities in a similar manner as described above. For example, the base station may be a repeater (e.g., a base station configured to amplify and/or forward signals). The repeater may have reduced capabilities as compared to a standard or baseline base station. Therefore, the minimum acceptable distance between a UE and the repeater (e.g., to avoid saturation) may be a larger distance than if the repeater were a baseline or standard base station.

Therefore, if the UE transmits a signal while the UE is located within the minimum acceptable distance between a UE and the base station (e.g., as described in the examples above in connection with drones/UAVs, RedCap UEs, and/or repeaters), then the signal may saturate the ADC of the base station and may cause the base station to be unable to receive the signal and/or any other concurrent signals, as described above. Similarly, if the base station transmits a signal while the UE is located near the antenna(s) of the base station, then the signal may saturate the ADC of the UE and may cause the UE to be unable to receive the signal and/or any other concurrent signals. Therefore, as described above, there may be a range of power inputs of signals at a receiver. As described above, because some UEs may travel to close to a wireless communication device, the range of power inputs (e.g., at a UE or a wireless communication device) may vary dynamically (e.g., as UEs move in the wireless network). Additionally, the range of power inputs (e.g., at a UE or a wireless communication device) may be a high or large range as UEs may be capable of travelling to close distances from an antenna of the wireless communication device. The high dynamic range of power inputs of signals may cause saturation at the receiver, as described above.

In some cases, the base station may attempt to perform uplink power control for the UE (e.g., by configuring an uplink power control configuration) to lower the transmit power of the UE that is located near the base station. However, as the UE and base station may be located close together, the UE and the base station may be unable to connect in an initial access procedure (e.g., using a RACH procedure) because acquisition signals transmitted by the base station (e.g., SSBs, SIBs, and/or downlink RACH messages) may saturate the front end components of the UE. Therefore, the UE and the base station may be unable to establish a communication connection. As a result, the base station may be unable to perform uplink power control for the UE and the UE may connect to another nearby base station. The nearby base station may perform uplink power control with respect to a distance between or received power at the other nearby base station (e.g., and not the base station). Therefore, signals transmitted by the UE (e.g., using the same operating frequency band as the base station) to the other nearby base station may be received by the base station and may cause saturation of the front end components of the base station, as described above. Moreover, even if the base station and the UE can establish a communication connection, the UE may be associated with a minimum transmit power that still causes saturation at the base station. For example, the base station may perform uplink power control to determine an uplink transmit power for the UE that will not cause saturation at the base station. However, the uplink power determined by the base station may be below a minimum transmit power of the UE. Therefore, any transmission by the UE that is received by the base station may risk causing saturation at the base station. In some cases, the receiving device (e.g., the base station or the UE) may be equipped with front end components (e.g., an ADC or other front end components) that includes a robust or enlarged range of acceptable power levels of input signals to the front end components (e.g., a robust or enlarged ADC bandwidth or bitwidth).

For example, the receiving device may be equipped with an ADC that has a higher resolution and/or a higher ADC power bandwidth in an attempt to mitigate a risk of saturation of the ADC. However, maintaining a high margin to saturation in this manner requires more expensive and larger (e.g., physically larger) front end components. As physical space within the receiving device for the front end components may be limited, using larger (e.g., physically larger) front end components may be undesirable. Moreover, maintaining a high margin to saturation in this manner consumes additional power resources of the receiving device by using front end components, such as an ADC, that have a higher resolution and a resulting higher power draw.

Additionally, problems similar to those described above may exist in a sidelink environment. For example, in some sidelink implementations, a symbol included in a sidelink communication may be associated with AGC acquisition. For example, a sidelink channel may include a repeated symbol (e.g., a first OFDM symbol and a second OFDM symbol of the sidelink channel may be repetitions of one another) that is to be used by a receiving UE to measure the signal and perform AGC for the sidelink channel (e.g., thereby potentially avoiding the problems described above). However, in some situations, a sidelink channel or sidelink communication may not include the repeated symbol that is used for AGC acquisition. For example, if sidelink SSBs (SL-SSBs) are used in the sidelink environment, an overhead associated with included the repeated symbol in each SL-SSB may be reduced by including the repeated symbol in only some SL-SSBs (e.g., and the AGC acquisition can be applied to the SL-SSBs that do not include the repeated symbol). Therefore, for sidelink channels or sidelink communications that do not include the symbol that is dedicated for AGC acquisition, similar problems as described above may exist in the sidelink environment.

Some techniques and apparatuses described herein enable initial access and communication handling for high dynamic range inputs at a receiver. For initial access (e.g., to establish a communication connection between a UE and wireless communication device (e.g., a base station or another UE)), the wireless communication device may transmit acquisition signals (e.g., SSBs, SIBs, and/or messages during a RACH procedure) as described above in connection with FIGS. 3-5. The wireless communication device may transmit a first set of acquisition signals using a first transmit power and may transmit a second set of acquisition signals using a second transmit power. The second transmit power may be lower than the first transmit power to enable each UR of proximate UEs (e.g., UEs that are located within the minimum acceptable distance between a UE and the wireless communication device, as described above) to receive an acquisition signal without saturation of an ADC of the UE. Additionally, the lower power acquisition signals (e.g., transmitted using the second transmit power) may carry or indicate an initial access power configuration that is optimized for the proximate UEs. For example, the proximate UEs may be configured with a RACH configuration that is different than a RACH configuration for non-proximate UEs (e.g., that indicates a lower uplink transmit power than an uplink transmit power for non-proximate UEs). A proximate UE (e.g., that receives a low power acquisition signal and is configured with the initial access power configuration that is optimized for the proximate UEs) may initiate a RACH procedure (e.g., by transmitting a response message using the initial access power configuration) to establish a communication connection with the wireless communication device.

Additionally, once a communication connection has been established, the UE and the wireless communication device may communicate using a low power configuration that is optimized based at least in part on a transmit power capability of the UE (e.g., a minimum transmit power, a beamforming capability, and/or an acceptable input range for an ADC of the UE) and/or location information or movement information of the UE. For example, the wireless communication device may configure one or more trigger events for switching between the low power configuration and a different configuration (e.g., that is associated with a higher transmit power and/or is associated with non-proximate UEs). As a result, the UE and the wireless communication device may be enabled to perform an initial access procedure (e.g., a RACH procedure) and to communicate in a connected mode when the UE is located within an expected minimum distance between a UE and the wireless communication device. Therefore, the UE and the wireless communication device may mitigate a risk of saturation of front end components of both the UE and the wireless communication device. This may improve a communication performance of the UE and the wireless communication device by ensuring that signals are not dropped or missed due to saturation of front end components. Moreover, this enables the UE and the wireless communication device to handle a higher dynamic range of power inputs that may result from different scenarios, as described above.

Figure 6:
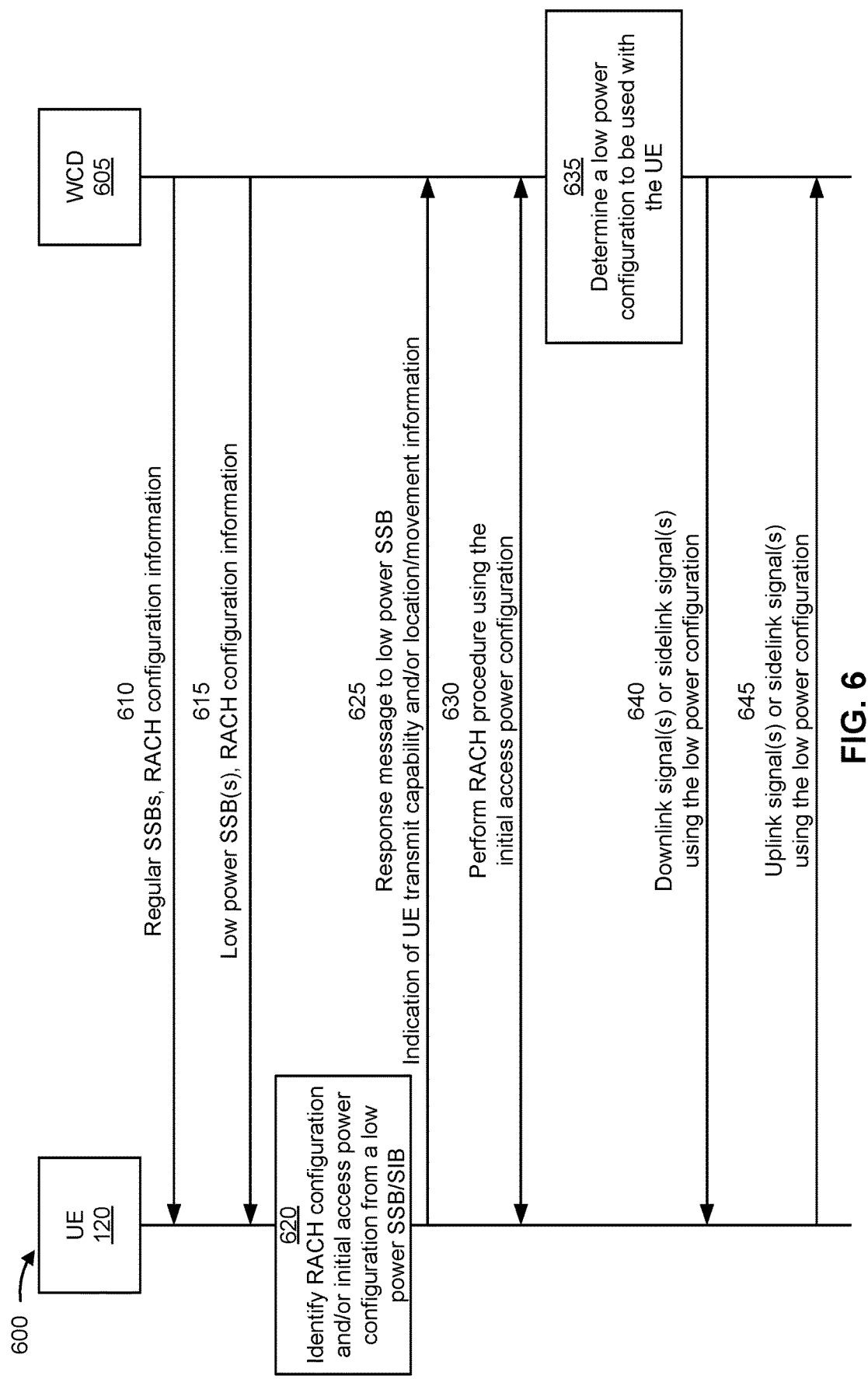
FIG. 6 is a diagram illustrating an example associated with initial access and communication handling for high dynamic range inputs at a receiver, in accordance with the present disclosure.

FIG. 6 is a diagram illustrating an example 600 associated with initial access and communication handling for high dynamic range inputs at a receiver, in accordance with the present disclosure. As shown in FIG. 6, a UE 120 and a wireless communication device (WCD) 605 may communicate with one another. The WCD 605 may be a base station 110, a UE 120, a repeater, an integrated access and backhaul (IAB) node, a relay, and/or another device. In some aspects, the UE 120 may be a drone or a UAV, or a drone or a UAV may include the UE 120. In some aspects, the UE 120 may be a RedCap UE. In some aspects, the UE 120 and the WCD 605 may be included in a wireless network, such as wireless network 100. The UE 120 and the WCD 605 may communicate via a wireless access link, which may include an uplink and a downlink. In some aspects, the UE 120 and the WCD 605 may communicate via a sidelink.

The WCD 605 may transmit one or more acquisition signals for initial access (e.g., to enable a UE to establish a communication connection with the WCD 605). "Acquisition signal" may refer to any signal that is transmitted by the WCD 605 that is needed by another device (e.g., UE 120) to establish a communication connection with the WCD 605. For example, an acquisition signal may include an SSB, an SIB, a downlink RACH message (e.g., msg2, msg4, and/or msgB), and/or a sidelink message (e.g., an SL-SSB and/or an SL-SIB), among other examples. As described above, a transmit power for acquisition signals transmitted by the WCD 605 may be based at least in part on an expected minimum distance between a UE (or another receiver device) and the WCD 605. For example, an acquisition signal may be associated with an energy per resource element (EPRE) (e.g., indicating an amount of energy (power) allocated for each resource element). The EPRE for an acquisition signal may be configured, or pre-configured, based at least in part on a type of acquisition signal, an operating bandwidth, an operating frequency, and/or a slot in which the acquisition signal is to be transmitted, among other examples. However, as described above, the EPRE (and/or a corresponding transmit power level) for an acquisition signal may designed or selected assuming that a receiver is outside of the expected minimum distance from the WCD 605. Acquisition signals that have an EPRE and/or corresponding transmit power level that are designed or selected assuming that a receiver is outside of the expected minimum distance from the WCD 605 may be referred to herein as regular acquisition signals, normal (or regular) power acquisition signals, and/or standard acquisition signals.

As show by reference number 610, the WCD 605 may transmit one or more (e.g., a set of) SSBs with a transmit power configuration and/or an EPRE that is designed or selected assuming that a receiver is outside of the expected minimum distance from the WCD 605 (e.g., one or more regular SSBs). For example, the WCD 605 may transmit the one or more regular SSBs in a similar manner as described above in connection with FIGS. 3-5. For example, the one or more regular SSBs may include (or may be associated with an SIB that indicates) RACH configuration information for UEs that are is outside of the expected minimum distance from the WCD 605, as described in more detail below.

As shown by reference number 615, the WCD 605 may transmit one or more (e.g., a set of) low power SSBs. The one or more low power SSBs may be transmitted with a lower transmit power or a lower EPRE than the one or more regular SSBs. In some aspects, a low power SSB may have a different EPRE ratio than an EPRE ratio of a regular SSB. An EPRE ratio of an SSB may be a ratio between an EPRE of a PSS of the SSB and an EPRE of a SSS of the SSB. In some aspects, the WCD 605 may transmit an indication of an EPRE for low power SSBs. For example, the WCD 605 may transmit an indication of an EPRE for the low power SSBs and/or the regular SSBs to enable receiver devices (e.g., the UE 120 and/or other devices) to receive the low power SSBs and/or the regular SSBs (e.g., to enable the WCD 605 to use different power levels for different SSBs). For example, the WCD 605 may transmit an indication of an EPRE for each SSB (e.g., for each SSB index). In some aspects, the WCD 605 may transmit an indication of an EPRE for a group of SSBs (e.g., a group of low power SSBs or a group of regular SSBs). The concepts described herein in connection with a low power SSB may be similarly applied to any acquisition signal that is transmitted by the WCD 605. As used herein, "low power" may refer to a transmit power or an EPRE that is less than a transmit power or an EPRE that would be used by the WCD 605 or the UE 120 if the UE 120 were outside of the expected minimum distance between the UE 120 and the WCD 605, as described above.

As described above in connection with FIG. 3, the WCD 605 may transmit SSBs in an SS burst. In some aspects, within an SS burst, a first subset (e.g., one or more) of the SSBs may be regular SSBs and a second subset (e.g., one or more) of SSBs may be low power SSBs. For example, the WCD 605 may be enabled to transmit a set of SSB with corresponding indexes (e.g., the set of SSBs may include 16 SSBs, 32 SSBs, and/or 64 SSBs). One or more of the SSB indexes may be reserved for or allocated for low power SSB transmissions.

In some aspects, the one or more low power SSBs may include low power SSBs that have different transmit power levels. For example, the one or more low power SSBs may include different groups of low power SSBs that correspond to different distances from the WCD 605. For example, a first group of low power SSBs may be associated with a first transmit power level, a second group of low power SSBs may be associated with a second transmit power level (e.g., that is higher than the first transmit power level), and a third group of low power SSBs may be associated with a third transmit power level (e.g., that is higher than the second transmit power level). The first transmit power level, the second transmit power level, and the third transmit power level may all be designed or selected assuming that a receiver device (e.g., the UE 120) is inside of the expected minimum distance from the WCD 605. This may enable the WCD 605 to transmit low power SSBs with more granularity for receiver devices that are at different distances from the WCD 605.

In some aspects, each group of low power SSBs may carry information that is specific to the group of low power SSBs. For example, an SIB may have a quasi-co-location (QCL) relationship with an SSB. An SIB that has a QCL relationship with a low power SSB in a group (e.g., the first group, the second group, or the third group) may carry information (e.g., a payload) that is specific to (or designed for) the group. For example, an SIB may carry or may indicate a RACH configuration. As described above, each group of low power SSBs may have a transmit power level that is designed or selected for a different distance from the WCD 605. An SIB that has a QCL relationship with a low power SSB in the first group of low power SSBs may carry information (e.g., a RACH configuration and/or uplink transmit power configuration information) that is designed for or selected for the distance from the WCD 605 associated with the first group.

A use of a group of low power SSBs may be based at least in part on location information and/or movement information of a receiver device (e.g., of the UE 120). For example, the UE 120 may be capable of receiving one or more SSBs from different groups of low power SSBs. The UE 120 may use a group of lower power SSBs (e.g., from the different groups of low power SSBs) based at least in part on location information and/or movement information of the UE 120. The location information and/or movement information of the UE 120 may include a position (e.g., a geographic position and/or coordinates) of the UE 120, a heading of the UE 120, an orientation of the UE 120, and/or a speed of the UE 120, among other examples. An association between location information and/or movement information and groups of low power SSBs may be indicated by the WCD 605 in a master information block (MIB) or an SIB. In some aspects, if the UE 120 has not received the indication of the association between location information and/or movement information and groups of low power SSBs, then the UE 120 may be assigned a group of low power SSBs by the WCD 605. For example, the UE 120 may use a default group of low power SSBs and/or may select a group of low power SSBs based at least in part on measurements performed by the UE 120.

When transmitting a low power SSB, the WCD 605 may not be required to performing beamforming or beam refinement procedures as link quality does not need to be maintained and a high beamforming gain is not required. For example, when transmitting a low power SSB, the WCD 605 may transmit the low power SSB in an omni-directional transmission (e.g., using a pseudo-omni beam or a wide beam). In other words, the WCD 605 may transmit the low power SSB using a beam that has not been refined (e.g., through a beam refinement procedure). This may conserve processing resources and/or power resources of the WCD 605 that would have otherwise been used to perform a beamforming procedure and/or a beam refinement procedure.

In some aspects, the WCD 605 may perform a beamforming operation to create or generate a beam that is associated with a low transmit power to transmit one or more low power SSBs. For example, the WCD 605 may perform a beamforming operation to create or generate a beam that is associated with no beamforming gain, a small beamforming gain, or a negative beamforming gain. The WCD 605 may perform a beamforming operation to create or generate a beam that is associated with low power in certain spatial directions. The WCD 605 may use the generated beam to transmit one or more low power SSBs.

In some aspects, multiple low power SSBs may be transmitted by the WCD 605 using the same transmit beam. For example, the WCD 605 may transmit one or more repetitions of a low power SSB using the same transmit beam. This may reduce a latency associated with initial access and channel acquisition by a proximate UE, such as the UE 120, as the low power SSBs may be transmitted more frequently than if the same transmit beam were not used by the WCD 605. In some aspects, the WCD 605 may transmit an indication of a quasi-co-location (QCL) relationship between multiple low power SSBs. In some aspects, the WCD 605 may transmit multiple low power SSBs using the same antenna, the same antenna array, and/or the same antenna port. In some aspects, the WCD 605 may transmit an indication that multiple low power SSBs are to be transmitted using the same transmit beam, an indication of a QCL relationship between multiple low power SSBs, and/or an indication of a common antenna port for multiple low power SSBs via an SIB (e.g., SIB1 as defined, or otherwise fixed, by the 3GPP specifications) or a master information block (MIB).

In some aspects, the WCD 605 may not frequency division multiplex (FDM) transmissions that include a low power SSB. For example, the WCD 605 may refrain from frequency division multiplexing the low power SSBs with other signals (e.g., a regular SSB or another signal to be transmitted by the WCD 605). The WCD 605 may not FDM other signals with the low power SSBs because the other signals may have a higher transmit power than the transmit power of a low power SSB (e.g., may have a transmit power that is designed or selected assuming that a receiver device is outside of the expected minimum distance from the WCD 605). This may ensure that a transmission that carries a low power SSB does not cause saturation at a receiver device (e.g., the UE 120) that is closer to the WCD 605 than the expected minimum distance from the WCD 605. In another example, the WCD 605 may only FDM a low power SSB with other signals that have a same transmit power as (or a transmit power that is within a threshold of) the transmit power of the low power SSB.

In some aspects, the WCD 605 may not FDM other signals with a low power SSB across multiple component carriers. For example, the UE 120 may support carrier aggregation. Carrier aggregation is a technology that enables two or more component carriers (CCs, sometimes referred to as carriers) to be combined (e.g., into a single channel) for a single UE to enhance data capacity. For example, carriers can be combined in the same or different frequency bands. Additionally, or alternatively, contiguous or non-contiguous carriers can be combined. The WCD 605 may not FDM another signal with a low power SSB (e.g., as described above) even if the other signal and the low power SSB are transmitted in different component carriers to ensure that the front end components of the UE 120 do not become saturated. In another example, the WCD 605 may not FDM another signal with a low power SSB over a bandwidth range. For example, the bandwidth range may be an initial bandwidth part (BWP) corresponding to the cell (e.g., associated with the WCD 605) that is transmitting the low power SSB, an active BWP, a bandwidth of a component carrier, and/or a bandwidth of a set of component carriers (e.g., in the case of carrier aggregation, where the set of component carriers may be contiguous or non-contiguous), among other examples.

In some aspects, the UE 120 may receive a low power SSB that is transmitted by the WCD 605. For example, as described above, the UE 120 may be within the expected minimum distance from the WCD 605. As used herein "proximate UE" may refer to a UE that is within the expected minimum distance from the WCD 605 or within a distance from the WCD 605 such that there is a high risk of saturation of front end components, as described above. Therefore, the UE 120 may be unable to receive a regular SSB. For example, the UE 120 may attempt to receive a regular SSB. However, due to the transmit power level of the regular SSB, front end components (e.g., an ADC) of the UE 120 may become saturated such that the UE 120 is unable to receive the regular SSB. The UE 120 may be enabled to receive a low power SSB due to the low transmit power level associated with the low power SSB, as described above. In some cases, an SSB may not be a cell-defining SSB. "Cell-defining SSB" may refer to an SSB that is used for defining a cell, and/or an SSB that includes a cell identifier, among other examples. When an SSB is not a cell-defining SSB, a MIB associated with the SSB may indicate a pointer to a synchronization raster point that carries or is associated with a cell-defining SSB, or to a specific SSB-index or set of SSB indices at that raster point (e.g., rather than carrying information to help the UE 120 to receive and/or decode a SIB (e.g., SIB1) and to initiate a RACH procedure to acquire a connection to the wireless system). A raster point in a synchronization raster may be a frequency at which an SSB can be deployed or transmitted. A Low-power SSB may be cell-defining or non-cell-defining. When a low power SSB is not cell-defining, the pointer to the raster point in the MIB referred to above, may point to the nearest-in-frequency cell-defining SSB raster-point, to a specific set of SSB-indices at this raster point, to a raster point containing at least one other low-power SSB transmission, and/or to a specific subset of low-power SSB indices in that raster point, among other examples.

As shown by reference number 620, the UE 120 may identify a RACH configuration and/or an initial access power configuration based at least in part on receiving the low power SSB. For example, the RACH configuration and/or the initial access power configuration may be indicated by the low power SSB. In some aspects, the RACH configuration and/or the initial access power configuration may be indicated via an SIB that has a QCL relationship with the low power SSB. In this way, the WCD 605 may configure the UE 120 (e.g., that receives a low power SSB) to use a RACH configuration and/or an initial access power configuration that is designed and/or selected assuming that the UE 120 is within the expected minimum distance from the WCD 605 (e.g., assuming the UE 120 is a proximate UE). For example, the RACH configuration and/or an initial access power configuration may configure the UE 120 to use a lower transmit power than a transmit power indicated by a RACH configuration associated with regular SSBs. For example, as described above, if the UE 120 (e.g., that is within the expected minimum distance from the WCD 605) were to use the RACH configuration associated with regular SSBs, then RACH messages (e.g., msgA, msg1, and/or msg3) transmitted by the UE 120 may cause saturation of front end components (e.g., an ADC) of the WCD 605. Therefore, based at least in part on receiving a low power SSB, the UE 120 may be configured to use a lower transmit power for an initial access procedure (e.g., a RACH procedure) than a transmit power that is used for initial access procedures when the UE 120 is outside of the expected minimum distance from the WCD 605.

For example, the RACH configuration and/or the initial access power configuration may indicate a set of RACH occasions that are associated with receiver devices that are within the expected minimum distance from the WCD 605. In some aspects, the RACH configuration and/or the initial access power configuration may indicate one or more uplink power control parameters that the UE 120 is to use for an initial access procedure (e.g., a RACH procedure) with the WCD 605. The one or more uplink power control parameters may include an open-loop power control parameter, an open-loop transmit power level parameter, a power ramping step size parameter, and/or a power control offset, among other examples. As described above, a value or setting of the one or more uplink power control parameters may be different than corresponding values or settings of uplink power control parameters that are to be used by UEs that are outside of the expected minimum distance from the WCD 605 (e.g., that receive and/or are capable of successfully receiving a regular SSB).

In some aspects, the RACH configuration and/or the initial access power configuration may indicate a PRACH waveform to be used by the UE 120. The PRACH waveform may be, or may indicate, a PRACH preamble format. The PRACH waveform may be designed to enable AGC acquisition by the WCD 605. For example, the PRACH waveform may be a long PRACH waveform (e.g., may be a longer PRACH waveform, in the time domain, than a PRACH waveform used by UEs that are outside of the expected minimum distance from the WCD 605). In some aspects, the PRACH waveform may be a long PRACH preamble format (e.g., as defined, or otherwise fixed, by the 3GPP Specifications). The long PRACH waveform may enable the WCD 605 to perform an AGC procedure in a first portion of the PRACH waveform to ensure that the signal of the PRACH waveform does not saturate front end components of the WCD 605. In some aspects, the PRACH waveform may indicate that a RACH message is to include one or more repeated OFDM symbols. For example, the PRACH waveform may indicate that the RACH message is to include a symbol that is a repetition of another symbol of the RACH message. In some aspects, the PRACH waveform may indicate that a first symbol and a second symbol may be identical (e.g., may be repetitions of one another). Therefore, the WCD 605 may be enabled to perform an AGC procedure using one or more symbols (e.g., that are repeated) to ensure that the signal of the PRACH waveform does not saturate front end components of the WCD 605.

In some aspects, the WCD 605 may not FDM other signals during the set of RACH occasions that are associated with receiver devices that are within the expected minimum distance from the WCD 605. For example, the WCD 605 may not schedule other uplink signals during the set of RACH occasions (e.g., in a similar manner to the WCD 605 refraining from frequency division multiplexing other signals with the low power acquisition signals transmitted by the WCD 605, as described above). In some aspects, the WCD 605 may refrain from frequency division multiplexing another signal with a RACH occasion, included in the set of RACH occasions, unless the other signal has the same transmit power as, or a transmit power within a threshold of, a transmit power of a response message that may be transmitted during the RACH occasion. In some aspects, where the WCD 605 supports full-duplex communication (e.g., where the WCD 605 is capable of transmitting signals and receiving signals at the same time), the WCD 605 may refrain from scheduling downlink signals during the set of RACH occasions (e.g., to mitigate a risk of self-interference with uplink signals transmitted during the set of RACH occasions). In some aspects, the WCD 605 may only schedule low-power downlink signals, such as low-power SSBs, during the set of RACH occasions. Additionally, the restriction on scheduling full-duplex downlink signals may apply over a bandwidth equal to a RACH bandwidth, an initial uplink BWP, an active BWP, an initial downlink BWP, an active BWP, an uplink component carrier bandwidth, a downlink component carrier bandwidth, a bandwidth corresponding to a set of aggregated uplink and downlink component carriers, and/or any combination thereof.

In some aspects, the UE 120 may be configured to use a subset of parameters from a set of parameters indicated by the RACH configuration and/or the initial access power configuration. For example, the UE 120 may be configured to use the subset of parameters based at least in part on a low power capability of the UE 120. A low power capability may include a minimum transmit power of the UE 120, a beamforming capability of the UE 120, and/or an input range of an ADC of the UE 120 (e.g., an ADC bandwidth or ADC bitwidth), among other examples. For example, the UE 120 may be configured to use the PRACH waveform (e.g., as described above) if the minimum transmit power of the UE 120 is above a threshold and/or is above a transmit power determined by the WCD 605 for uplink power control.

In some aspects, different RACH occasions (e.g., RACH occasions for UEs that are within the expected minimum distance from the WCD 605) may be associated with different sets of uplink power control parameters and/or different initial access power configurations. The UE 120 may be assigned to a RACH occasion based at least in part on a low power capability of the UE 120, location information of the UE 120, and/or movement information of the UE 120, among other examples. Therefore, the RACH configuration and/or the initial access power configuration to be used by the UE 120 may be optimized based at least in part on capabilities of the UE 120 and/or the location or movement of the UE 120 to ensure that front end components of the UE 120 and/or the WCD 605 are not saturated during an initial access procedure (e.g., during a RACH procedure).

In some aspects, the different RACH occasions may correspond to different distances from the WCD 605 (e.g., in a similar manner as described above in connection with the different groups of low power SSBs). For example, the UE 120 may use a RACH occasion based at least in part on the location of the UE 120 and/or a movement of the UE 120 (e.g., a heading, an orientation, and/or a speed). In some aspects, the location and/or movement of the UE 120 may indicate an upcoming position of the UE 120 (e.g., that is closer to, or further from, the WCD 605). The UE 120 may be configured to use a RACH occasion (e.g., and corresponding RACH configuration and/or initial access power configuration) that is designed and/or selected based at least in part on the upcoming position.

As shown by reference number 625, the UE 120 may transmit, and the WCD 605 may receive, a response message to the low power SSB received by the UE 120. The response message may be an uplink RACH message (e.g., msgA, msg1, and/or msg3) or another uplink message. The UE 120 may transmit the response message using a transmit power level that is indicated by the RACH configuration and/or the initial access power configuration, as described above. By transmitting the response message using a transmit power level that is indicated by the RACH configuration and/or the initial access power configuration, the WCD 605 and the UE 120 may ensure that AGC may be successfully performed (e.g., may ensure that front end components of the WCD 605 and/or the UE 120 are not saturated during an initial access procedure).

In some aspects, the response message may indicate at least one low power capability of the UE 120 and/or location information of the UE 120. For example, the response message may indicate a minimum transmit power of the UE 120, a beamforming capability of the UE 120, and/or an input range of an ADC of the UE 120 (e.g., an ADC bandwidth or ADC bitwidth), movement information of the UE 120 (e.g., a speed, a heading, and/or an orientation), and/or location information of the UE 120 (e.g., a geographic position and/or coordinates), among other examples. In some aspects, the at least one low power capability of the UE 120 and/or location information of the UE 120 may be indicated in a RACH message (e.g., msg1, msg3, or msgA). In some aspects, the at least one low power capability of the UE 120 and/or location information of the UE 120 may be indicated in an uplink message that is not associated with a RACH procedure. The WCD 605 may use the at least one low power capability of the UE 120 and/or location information of the UE 120 to optimize the initial access power configuration and/or to determine a power control configuration to be used by the UE 120 and/or the WCD 605 in a connected communication mode, as described in more detail below.

In some aspects, the at least one low power capability of the UE 120 and/or location information of the UE 120 may be explicitly indicated in the response message. In some aspects, the WCD 605 may determine the at least one low power capability of the UE 120 and/or location information of the UE 120 based at least in part on an implicit indication associated with the response message. For example, the WCD 605 may determine location information associated with the UE 120 based at least in part on a RACH occasion used by the UE 120 to transmit the response message. As described herein, the WCD 605 may configure different RACH occasions that correspond to different distances from the WCD 605. Therefore, the WCD 605 may determine location information associated with the UE 120 based at least in part on a RACH occasion used to transmit the response message to the WCD 605.

As shown by reference number 630, the UE 120 and the WCD 605 may perform a RACH procedure using the initial access power configuration. The RACH procedure may be a two-step RACH procedure or a four-step RACH procedure. As described above, the UE 120 may transmit RACH messages (e.g., msg1, msg3, or msgA) using a transmit power that is lower than a transmit power of corresponding RACH messages for UEs that are outside of the expected minimum distance from the WCD 605. Similarly, the WCD 605 may transmit RACH messages (e.g., msg2, msg4, or msgB) using a transmit power that is lower than a transmit power of corresponding RACH messages for UEs that are outside of the expected minimum distance from the WCD 605. By performing the RACH procedure as described herein, the UE 120 and the WCD 605 may be enabled to successfully perform the RACH procedure when the UE 120 is within the expected minimum distance from the WCD 605 (e.g., when the UE 120 is located proximate to or near the WCD 605). As a result, the UE 120 and the WCD 605 may be enabled to successfully establish a communication connection when the UE 120 is within the expected minimum distance from the WCD 605.

As shown by reference number 635, the WCD 605 may determine one or more low power configurations to be used with the UE 120. For example, the WCD 605 may determine an uplink low power configuration to be used by the UE 120 and a downlink low power configuration to be used by the WCD 605. In some aspects, the WCD 605 may determine a low power configuration to be used with the UE 120 based at least in part on at least one low power capability of the UE 120 and/or location information of the UE 120 (e.g., that is indicated in the response message from the UE 120, as described above). For example, similar problems associated with high transmit powers for UEs that are within the expected minimum distance from the WCD 605 during initial access may continue to persist once the WCD 605 and the UE 120 establish a communication connection and are operating in a connect mode (e.g., an RRC connected mode). Therefore, an uplink power control and/or a downlink power control may be designed or selected by the WCD 605 to ensure that signals between the WCD 605 and the UE 120 do not saturate front end components of the WCD 605 and/or front end components of the UE 120.

For example, the WCD 605 may determine that downlink signals to be transmitted to the UE 120 are to use a low transmit power and/or a beam associated with a low transmit power (e.g., as compared to a transmit power of downlink signals to be transmitted to UEs that are outside of the expected minimum distance from the WCD 605). In some aspects, the WCD 605 may determine downlink power control parameters based at least in part on at least one low power capability of the UE 120 and/or location information of the UE 120. In some aspects, the WCD 605 may determine the downlink power control parameters and may not indicate the downlink power control parameters to the UE 120 (e.g., the WCD 605 may perform downlink power control in a transparent fashion to the UE 120, such that the UE 120 is not aware of the downlink power control).

The WCD 605 may determine an uplink low power configuration to be used by the UE 120 based at least in part on at least one low power capability of the UE 120 and/or location information of the UE 120. The WCD 605 may transmit, to the UE 120, an indication of the uplink low power configuration. In some aspects, the WCD 605 may determine a regular uplink power configuration for the UE 120 that is associated with a higher transmit power than a transmit power associated with the uplink low power configuration. For example, the regular uplink power configuration may be a power configuration that is to be used by the UE 120 when the UE 120 is outside of the minimum expected distance from the WCD 605.

In some aspects, the uplink low power configuration to be used by the UE 120 may indicate whether the UE 120 is to perform a beam refinement procedure for receive beams to be used by the UE 120. In some aspects, the uplink low power configuration may indicate that the UE 120 is to use a weaker receive beam rather than a strongest receive beam. For example, typical beam management procedures may include the UE 120 selecting a receive beam that is associated with a highest measurement parameter (e.g., a strongest receive beam). The uplink low power configuration may indicate that the UE 120 is to use a receive beam other than the strongest receive beam to mitigate a risk of saturation of front end components of the UE 120.

In some aspects, the uplink low power configuration may indicate one or more power control parameters to be used by the UE 120. For example, the uplink low power configuration may indicate one or more closed-loop power control parameters. In some aspects, the WCD 605 may configure the UE 120 with a first set of closed-loop power control parameters for the uplink low power configuration and a second set of closed-loop power control parameters for the regular uplink power configuration. For example, the WCD 605 may configure the UE 120 with separate, independent, closed loops for uplink power control for the uplink low power configuration and the regular uplink power configuration. The UE 120 may transition between the separate, independent, closed loops based at least in part on an explicit indication from the WCD 605 or based at least in part on an implicit indication (e.g., by detecting a trigger event as described in more detail below).

In some aspects, the uplink low power configuration may indicate whether the UE 120 is to perform beam refinement for a transmit beam to be used by the UE 120. For example, the uplink low power configuration may indicate that the UE 120 should not perform beam refinement for a transmit beam to be used by the UE 120 (e.g., by refining a corresponding receive beam for a source reference signal associated with the transmit beam). As a result, the transmit beam to be used by the UE 120 may not have a beamforming gain (or may have a smaller beamforming gain) than if the UE 120 had performed the beam refinement procedure. This may ensure that signals transmitted by the UE 120 have a lower transmit power to mitigate a risk of saturation of front end components of the WCD 605.

In some aspects, the uplink low power configuration may indicate a sounding reference signal (SRS) configuration for uplink beam sweeping to be used by the UE 120. The SRS configuration may be used by the UE 120 and/or the WCD 605 for beam management. In some aspects, the SRS configuration may indicate that the UE 120 is to select low power uplink beams (e.g., rather than an uplink beam with the highest power). The SRS configuration may enable the UE 120 to select a suitable low power uplink beam for communications between the UE 120 and the WCD 605. As a result, a risk of saturation of front end components of the WCD 605 may be mitigated or reduced by using a low power uplink beam.

In some aspects, the WCD 605 may configure the UE 120 with one or more trigger events for switching between the uplink low power configuration and the regular uplink power configuration. For example, the WCD 605 may transmit, to the UE 120, an indication of the one or more trigger events. When a trigger event is detected by the UE 120 and/or the WCD 605, the UE 120 may transition from the uplink low power configuration to the regular uplink power configuration or from the regular uplink power configuration to the uplink low power configuration.

The one or more trigger events may include a movement or location trigger event, an amount of time associated with the use of the low power configuration, and/or a downlink measurement parameter trigger event, among other examples. For example, a trigger event may be based at least in part on a position (e.g., a geographic position and/or coordinates) of the UE 120, a heading of the UE 120, an orientation of the UE 120, and/or a speed of the UE 120, among other examples. In some aspects, a trigger event may be a time-based trigger event. For example, a trigger event may indicate an amount of time that the UE 120 is to use the uplink low power configuration. In some aspects, the uplink low power configuration may be a periodic configuration. In some aspects, the WCD 605 may determine an amount of time associated with a time-based trigger event based at least in part on information received from the UE 120. For example, the UE 120 may transmit, to the WCD 605, information indicating an amount of time that the UE 120 is to be located within the expected minimum distance from the WCD 605. For example, the UE 120 may transmit, to the WCD 605, an expected path or a planned path that the UE 120 is following. For example, where the UE 120 is a drone or UAV, or where the UE 120 is included in a drone or UAV, the expected path or the planned path may be a flight path or flight plan. The WCD 605 may use the information provided by the UE 120 to determine an amount of time that the UE 120 will require the uplink low power configuration (e.g., to determine an amount of time that the UE 120 will be located within the expected minimum distance from the WCD 605).

In some aspects, a trigger event may be a downlink measurement parameter trigger event. For example, the UE 120 may be configured to transition between the uplink low power configuration and the regular uplink power configuration based at least in part on downlink signal measurements performed by the UE 120. In some aspects, a trigger event may indicate that the UE 120 is to use the uplink low power configuration if a measurement (e.g., an RSRP measurement or an RSSI measurement) of a downlink signal from the WCD 605 satisfies a threshold. In some aspects, a trigger event may indicate that the UE 120 is to switch from the uplink low power configuration to the regular uplink power configuration if a measurement (e.g., an RSRP measurement or an RSSI measurement) of a downlink signal from the WCD 605 is below a threshold.

As shown by reference number 640, the WCD 605 may transmit, and the UE 120 may receive, one or more downlink signals (or sidelink signals) using a low power configuration (e.g., using a low transmit power). As shown by reference number 645, the UE 120 may transmit, and the WCD 605 may receive, one or more uplink signals (or sidelink signals) using the uplink low power configuration. In some aspects, the WCD 605 may refrain from frequency division multiplexing other signals (e.g., that have a higher transmit power) with the signals transmitted by the WCD 605 and/or with the signals transmitted by the UE 120. This may ensure that the other signals do not cause saturation of front end components of the WCD 605 and/or the UE 120. In some aspects, the WCD 605 may explicitly indicate to the UE 120 a transition from a low power configuration to a regular or high power configuration. In some aspects, a transition from a low power configuration to a regular or high power configuration may be implicitly indicated. For example, the UE 120 and/or the WCD 605 may detect or identify a trigger event, as described above.

As a result, the UE 120 and the WCD 605 may be enabled to perform an initial access procedure (e.g., a RACH procedure) and to communicate in a connected mode when the UE 120 is located within an expected minimum distance between a UE 120 and the WCD 605. Therefore, the UE 120 and the WCD 605 may mitigate a risk of saturation of front end components of both the UE 120 and the WCD 605. This improves a communication performance of the UE 120 and the WCD 605 by ensuring that signals are not dropped or missed due to saturation of front end components.

As indicated above, FIG. 6 is provided as an example. Other examples may differ from what is described with respect to FIG. 6.

FIG. 7 is a diagram illustrating an example process 700 performed, for example, by a UE, in accordance with the present disclosure. Example process 700 is an example where the UE (e.g., UE 120) performs operations associated with initial access and communication handling for high dynamic range inputs at a receiver.

As shown in FIG. 7, in some aspects, process 700 may include receiving, from a wireless communication device, an acquisition signal that uses a lower transmit power level than a transmit power level of one or more other acquisition signals transmitted by the wireless communication device (block 710). For example, the UE (e.g., using reception component 902, depicted in FIG. 9) may receive, from a wireless communication device, an acquisition signal that uses a lower transmit power level than a transmit power level of one or more other acquisition signals transmitted by the wireless communication device, as described above.

As further shown in FIG. 7, in some aspects, process 700 may include transmitting, to the wireless communication device, a response message to the acquisition signal, that uses an initial access power configuration associated with the acquisition signal, the response message indicating at least one low power capability of the UE or location information of the UE (block 720). For example, the UE (e.g., using transmission component 904, depicted in FIG. 9) may transmit, to the wireless communication device, a response message to the acquisition signal, that uses an initial access power configuration associated with the acquisition signal, the response message indicating at least one low power capability of the UE or location information of the UE, as described above.

As further shown in FIG. 7, in some aspects, process 700 may include communicating, with the wireless communication device, in a connected communication mode using a low power configuration that is based at least in part on the at least one low power capability of the UE or the location information of the UE (block 730). For example, the UE (e.g., using reception component 902 and/or the transmission component 904, depicted in FIG. 9) may communicate, with the wireless communication device, in a connected communication mode using a low power configuration that is based at least in part on the at least one low power capability of the UE or the location information of the UE, as described above.

Process 700 may include additional aspects, such as any single aspect or any combination of aspects described below and/or in connection with one or more other processes described elsewhere herein.

In a first aspect, transmitting the response message comprises transmitting at least one of an uplink message, a sidelink message, or a random access channel message.

In a second aspect, alone or in combination with the first aspect, receiving the acquisition signal comprises receiving an indication of a random access channel occasion associated with the acquisition signal and the initial access power configuration associated with the random access channel occasion, wherein transmitting the response message comprises transmitting, during the random access channel occasion, the response message using the initial access power configuration.

In a third aspect, alone or in combination with one or more of the first and second aspects, the initial access power configuration indicates at least one of one or more power control parameters to be used by the UE, or a PRACH waveform to be used by the UE, the PRACH waveform including at least one of a long PRACH preamble format or one or more repeated symbols to be included in the PRACH waveform.

In a fourth aspect, alone or in combination with one or more of the first through third aspects, process 700 includes receiving an indication of the low power configuration and a different power configuration, the different power configuration being associated with a higher transmit power level than a transmit power level of the low power configuration, and receiving an indication of one or more trigger events indicating when the UE is to switch from using the low power configuration to using the different power configuration.

In a fifth aspect, alone or in combination with the fourth aspect, receiving the indication of the low power configuration and the different power configuration comprises receiving an indication of at least one of a first closed loop power control parameter for the low power configuration and a second closed loop power control parameter for the different power configuration, a beamforming configuration for communications to be transmitted by the UE when using the low power configuration, or an SRS configuration for uplink beam sweeping to be used by the UE when using the low power configuration.

In a sixth aspect, alone or in combination with one or more of the first through fifth aspects, transmitting the response message comprises transmitting an indication of the at least one low power capability of the UE or the location information of the UE that includes at least one of a minimum transmit power level of the UE, a beamforming capability of the UE, an input range of an analog to digital converter of the UE, movement information of the UE, or location information of the UE, where the indication of one or more low power capabilities of the UE or the location information of the UE is explicitly indicated in the response message or implicitly indicated based at least in part on a random access channel occasion used to transmit the response message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a wireless communication device, in accordance with the present disclosure. Example process 800 is an example where the wireless communication device (e.g., WCD 605) performs operations associated with initial access and communication handling for high dynamic range inputs at a receiver.

As shown in FIG. 8, in some aspects, process 800 may include transmitting a set of acquisition signals that includes a first subset of acquisition signals having a first transmit power level and a second subset of acquisition signals having a second transmit power level that is less than the first transmit power level (block 810). For example, the wireless communication device (e.g., using transmission component 1004, depicted in FIG. 10) may transmit a set of acquisition signals that includes a first subset of acquisition signals having a first transmit power level and a second subset of acquisition signals having a second transmit power level that is less than the first transmit power level, as described above.

As further shown in FIG. 8, in some aspects, process 800 may include receiving, from a UE, a response message, that uses an initial access power configuration associated with an acquisition signal included in the second subset of acquisition signals, the response message indicating at least one power capability of the UE or location information of the UE (block 820). For example, the wireless communication device (e.g., using reception component 1002, depicted in FIG. 10) may receive, from a UE, a response message, that uses an initial access power configuration associated with an acquisition signal included in the second subset of acquisition signals, the response message indicating at least one power capability of the UE or location information of the UE, as described above.

As further shown in FIG. 8, in some aspects, process 800 may include communicating, with the UE, in a connected communication mode using a low power configuration that is based at least in part on the at least one low power capability of the UE or the location information of the UE (block 830). For example, the wireless communication device (e.g., using reception component 1002 and/or the transmission component 1004, depicted in FIG. 10) may communicate, with the UE, in a connected communication mode using a low power configuration that is based at least in part on the at least one low power capability of the UE or the location information of the UE, as described above.

Process 800 may include additional aspects, such as any single aspect or any combination of aspects described below and/or in connection with one or more other processes described elsewhere herein.

In a first aspect, transmitting the set of acquisition signals comprises transmitting at least one of an SSB, an SIB, a random access channel message, or a sidelink message.

In a second aspect, alone or in combination with the first aspect, transmitting the set of acquisition signals comprises transmitting the second subset of acquisition signals in an omni-directional transmission or without performing beam refinement.

In a third aspect, alone or in combination with one or more of the first and second aspects, process 800 includes refraining from scheduling a first message that is to be frequency division multiplexed with an acquisition signal, included in the second subset of acquisition signals, unless the first message uses the second transmit power level or a transmit power level that is within a first threshold amount of the second transmit power level, and refraining from scheduling a second message that is to be frequency division multiplexed with the response message unless the second message uses a transmit power level that is the same as, or is within a second threshold amount of, a transmit power level associated with the initial access power configuration.

In a fourth aspect, alone or in combination with one or more of the first through third aspects, transmitting the set of acquisition signals comprises transmitting the second subset of acquisition signals including a third subset of acquisition signals, from the second subset of acquisition signals, and a fourth subset of acquisition signals, from the second subset of acquisition signals, wherein the third subset of acquisition signals and the fourth subset of acquisition signals are transmitted using different transmit power levels.

In a fifth aspect, alone or in combination with one or more of the first through fourth aspects, the at least one low power capability of the UE or the location information of the UE indicates at least one of a minimum transmit power level of the UE, a beamforming capability of the UE, an input range of an analog to digital converter of the UE, movement information of the UE, or location information of the UE.

In a sixth aspect, alone or in combination with one or more of the first through fifth aspects, process 800 includes transmitting, to the UE, an indication of one or more trigger events indicating when the UE is to switch from using the low power configuration to using a different power configuration, wherein the one or more trigger events include at least one of a movement or location trigger event, an amount of time associated with the use of the low power configuration, or a downlink measurement parameter trigger event.

In a seventh aspect, alone or in combination with one or more of the first through sixth aspects, communicating, with the UE, in the connected communication mode using the low power configuration comprises at least one of transmitting, to the UE, one or more signals that use a transmit power level that is based at least in part on the at least one low power capability of the UE or the location information of the UE, or receiving, from the UE, one or more signals that are transmitted by the UE using a transmit power level that is based at least in part on the at least one low power capability of the UE or the location information of the UE.

In an eighth aspect, alone or in combination with one or more of the first through seventh aspects, transmitting the set of acquisition signals comprises transmitting the first subset of acquisition signals that are associated with a first set of RACH occasions, wherein the first set of RACH occasions are associated with a first initial access power configuration to be used by the UE, and transmitting the second subset of acquisition signals that are associated with a second set of RACH occasions, wherein the second set of RACH occasions are associated with a second initial access power configuration to be used by the UE, wherein the second initial access power configuration is associated with a lower transmit power level than a transmit power level associated with the first initial access power configuration, and wherein receiving the response message comprises receiving the response message that is transmitted by the UE using the second initial access power configuration.

In a ninth aspect, alone or in combination with one or more of the first through eighth aspects, process 800 includes determining the low power configuration for the UE based at least in part on the at least one low power capability of the UE or the location information of the UE, and transmitting, to the UE, an indication of the low power configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
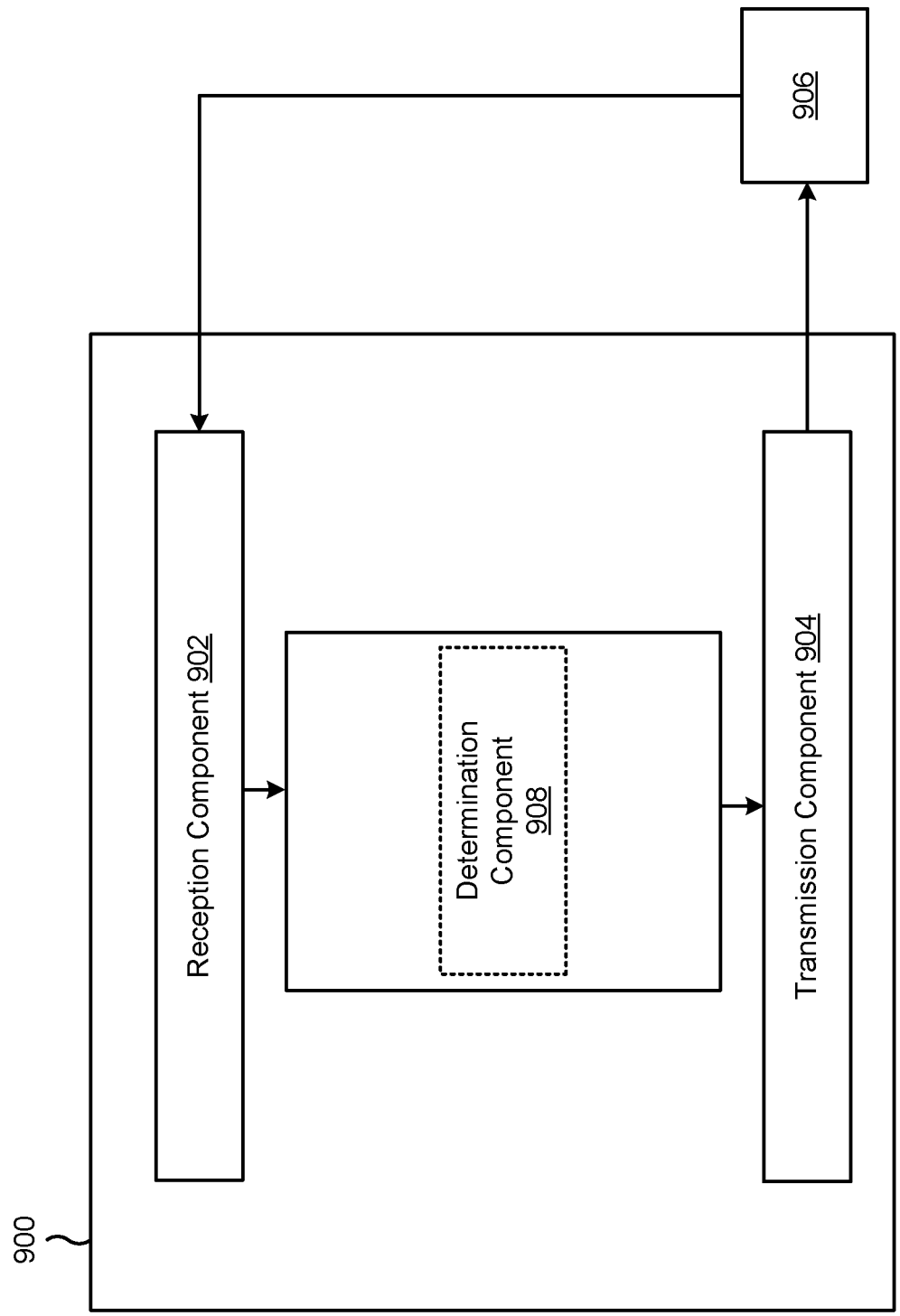
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive, from a wireless communication device, an acquisition signal that uses a lower transmit power level than a transmit power level of one or more other acquisition signals transmitted by the wireless communication device. The transmission component 904 may transmit, to the wireless communication device, a response message to the acquisition signal, that uses an initial access power configuration associated with the acquisition signal, the response message indicating at least one low power capability of the UE or location information of the UE. The reception component 902 and/or the transmission component 904 may communicate, with the wireless communication device, in a connected communication mode using a low power configuration that is based at least in part on the at least one low power capability of the UE or the location information of the UE.

The determination component 908 may determine or identify one or more transmit power parameters for an initial access message or a RACH message based at least in part on the initial access power configuration. The determination component 908 may determine or identify one or more transmit power parameters for an uplink transmission based at least in part on the low power configuration.

The reception component 902 may receive an indication of the low power configuration and a different power configuration, the different power configuration being associated with a higher transmit power level than a transmit power level of the low power configuration. The reception component 902 may receive an indication of one or more trigger events indicating when the UE is to switch from using the low power configuration to using the different power configuration.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
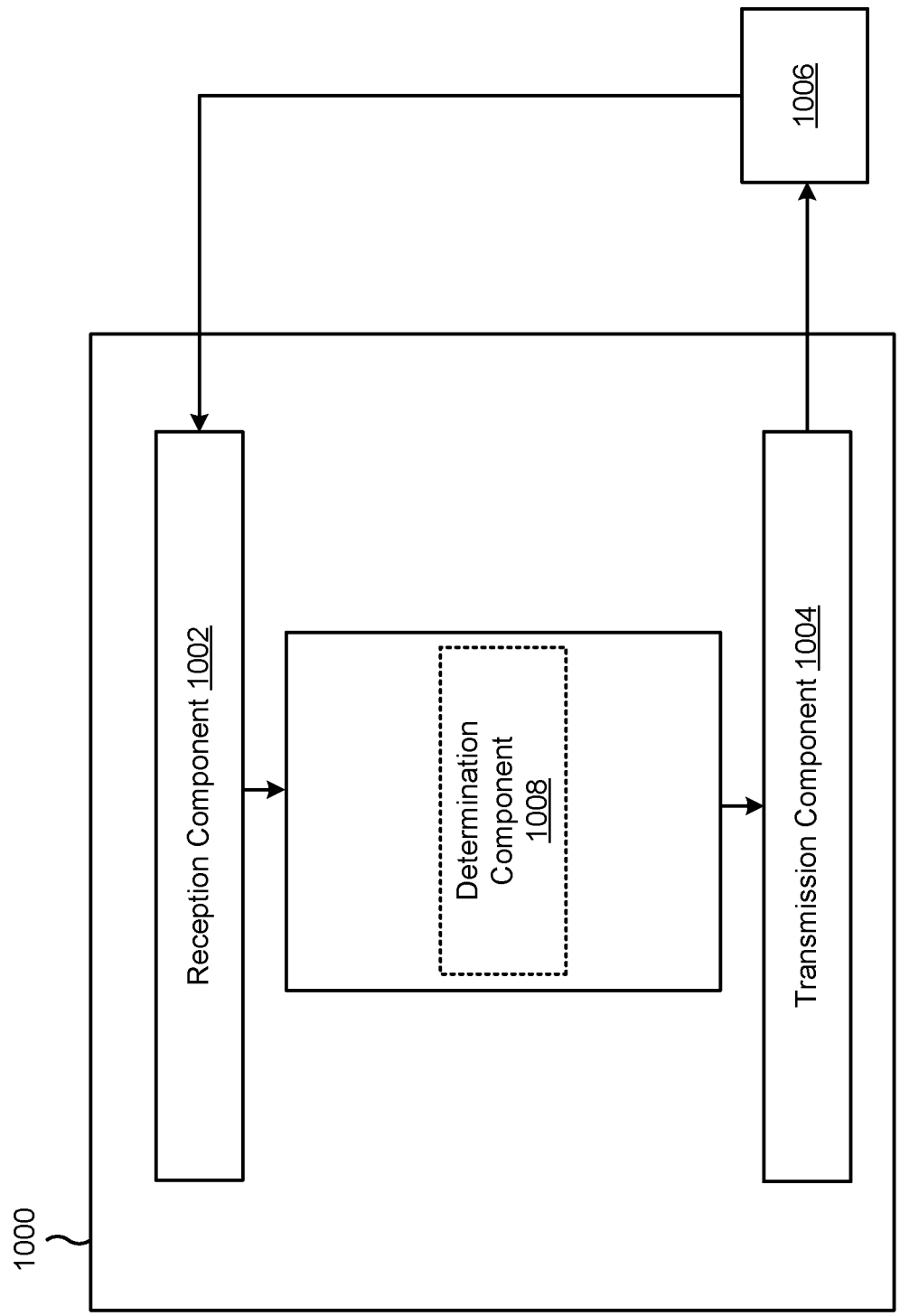

FIG. 10 is a block diagram of an example apparatus 1000 for wireless communication. The apparatus 1000 may be a wireless communication device, or a wireless communication device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the wireless communication device described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the wireless communication device described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the wireless communication device described above in connection with FIG. 2. In some aspects, the transmission component 1004 may be co-located with the reception component 1002 in a transceiver.

The transmission component 1004 may transmit a set of acquisition signals that includes a first subset of acquisition signals having a first transmit power level and a second subset of acquisition signals having a second transmit power level that is less than the first transmit power level. The reception component 1002 may receive, from a UE, a response message, that uses an initial access power configuration associated with an acquisition signal included in the second subset of acquisition signals, the response message indicating at least one power capability of the UE or location information of the UE. The reception component 1002 and/or the transmission component 1004 may communicate, with the UE, in a connected communication mode using a low power configuration that is based at least in part on the at least one low power capability of the UE or the location information of the UE.

The determination component 1008 may refrain from scheduling a first message that is to be frequency division multiplexed with an acquisition signal, included in the second subset of acquisition signals, unless the first message uses the second transmit power level or a transmit power level that is within a first threshold amount of the second transmit power level. The determination component 1008 may refrain from scheduling a second message that is to be frequency division multiplexed with the response message unless the second message uses a transmit power level that is the same as, or is within a second threshold amount of, a transmit power level associated with the initial access power configuration.

The transmission component 1004 may transmit, to the UE, an indication of one or more trigger events indicating when the UE is to switch from using the low power configuration to using a different power configuration, wherein the one or more trigger events include at least one of a movement or location trigger event, an amount of time associated with the use of the low power configuration, or a downlink measurement parameter trigger event.

The determination component 1008 may determine the low power configuration for the UE based at least in part on the at least one low power capability of the UE or the location information of the UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a wireless communication device, an acquisition signal that uses a lower transmit power level than a transmit power level of one or more other acquisition signals transmitted by the wireless communication device; transmitting, to the wireless communication device, a response message to the acquisition signal, that uses an initial access power configuration associated with the acquisition signal, the response message indicating at least one low power capability of the UE or location information of the UE; and communicating, with the wireless communication device, in a connected communication mode using a low power configuration that is based at least in part on the at least one low power capability of the UE or the location information of the UE.

Aspect 2: The method of Aspect 1, wherein transmitting the response message comprises transmitting at least one of: an uplink message, a sidelink message, or a random access channel message.

Aspect 3: The method of any of Aspects 1-2, wherein receiving the acquisition signal comprises: receiving an indication of a random access channel occasion associated with the acquisition signal and the initial access power configuration associated with the random access channel occasion, wherein transmitting the response message comprises: transmitting, during the random access channel occasion, the response message using the initial access power configuration.

Aspect 4: The method of any of Aspects 1-3, wherein the initial access power configuration indicates at least one of: one or more power control parameters to be used by the UE, or a physical random access channel (PRACH) waveform to be used by the UE, the PRACH waveform including at least one of a long PRACH preamble format or one or more repeated symbols to be included in the PRACH waveform.

Aspect 5: The method of any of Aspects 1-4, further comprising: receiving an indication of the low power configuration and a different power configuration, the different power configuration being associated with a higher transmit power level than a transmit power level of the low power configuration; and receiving an indication of one or more trigger events indicating when the UE is to switch from using the low power configuration to using the different power configuration.

Aspect 6: The method of Aspect 5, wherein receiving the indication of the low power configuration and the different power configuration comprises: receiving an indication of at least one of: a first closed loop power control parameter for the low power configuration and a second closed loop power control parameter for the different power configuration, a beamforming configuration for communications to be transmitted by the UE when using the low power configuration, or a sounding reference signal (SRS) configuration for uplink beam sweeping to be used by the UE when using the low power configuration.

Aspect 7: The method of any of Aspects 1-6, wherein transmitting the response message comprises: transmitting an indication of the at least one low power capability of the UE or the location information of the UE that includes at least one of: a minimum transmit power level of the UE, a beamforming capability of the UE, an input range of an analog to digital converter of the UE, movement information of the UE, or location information of the UE, wherein the indication of one or more low power capabilities of the UE or the location information of the UE is explicitly indicated in the response message or implicitly indicated based at least in part on a random access channel occasion used to transmit the response message.

Aspect 8: A method of wireless communication performed by a wireless communication device, comprising: transmitting a set of acquisition signals that includes a first subset of acquisition signals having a first transmit power level and a second subset of acquisition signals having a second transmit power level that is less than the first transmit power level; receiving, from a user equipment (UE), a response message, that uses an initial access power configuration associated with an acquisition signal included in the second subset of acquisition signals, the response message indicating at least one power capability of the UE or location information of the UE; and communicating, with the UE, in a connected communication mode using a low power configuration that is based at least in part on the at least one low power capability of the UE or the location information of the UE.

Aspect 9: The method of Aspect 8, wherein transmitting the set of acquisition signals comprises transmitting at least one of: a synchronization signal block (SSB), a system information block (SIB), a random access channel message, or a sidelink message.

Aspect 10: The method of any of Aspects 8-9, wherein transmitting the set of acquisition signals comprises: transmitting the second subset of acquisition signals in an omnidirectional transmission or without performing beam refinement.

Aspect 11: The method of any of Aspects 8-10, further comprising: refraining from scheduling a first message that is to be frequency division multiplexed with an acquisition signal, included in the second subset of acquisition signals, unless the first message uses the second transmit power level or a transmit power level that is within a first threshold amount of the second transmit power level; and refraining from scheduling a second message that is to be frequency division multiplexed with the response message unless the second message uses a transmit power level that is the same as, or is within a second threshold amount of, a transmit power level associated with the initial access power configuration.

Aspect 12: The method of any of Aspects 8-11, wherein transmitting the set of acquisition signals comprises: transmitting the second subset of acquisition signals including a third subset of acquisition signals, from the second subset of acquisition signals, and a fourth subset of acquisition signals, from the second subset of acquisition signals, wherein the third subset of acquisition signals and the fourth subset of acquisition signals are transmitted using different transmit power levels.

Aspect 13: The method of any of Aspects 8-12, wherein the at least one low power capability of the UE or the location information of the UE indicates at least one of: a minimum transmit power level of the UE, a beamforming capability of the UE, an input range of an analog to digital converter of the UE, movement information of the UE, or location information of the UE.

Aspect 14: The method of any of Aspects 8-13, further comprising: transmitting, to the UE, an indication of one or more trigger events indicating when the UE is to switch from using the low power configuration to using a different power configuration, wherein the one or more trigger events include at least one of: a movement or location trigger event, an amount of time associated with the use of the low power configuration, or a downlink measurement parameter trigger event.

Aspect 15: The method of any of Aspects 8-14, wherein communicating, with the UE, in the connected communication mode using the low power configuration comprises at least one of: transmitting, to the UE, one or more signals that use a transmit power level that is based at least in part on the at least one low power capability of the UE or the location information of the UE; or receiving, from the UE, one or more signals that are transmitted by the UE using a transmit power level that is based at least in part on the at least one low power capability of the UE or the location information of the UE.

Aspect 16: The method of any of Aspects 8-15, wherein transmitting the set of acquisition signals comprises: transmitting the first subset of acquisition signals that are associated with a first set of random access channel (RACH) occasions, wherein the first set of RACH occasions are associated with a first initial access power configuration to be used by the UE; and transmitting the second subset of acquisition signals that are associated with a second set of RACH occasions, wherein the second set of RACH occasions are associated with a second initial access power configuration to be used by the UE, wherein the second initial access power configuration is associated with a lower transmit power level than a transmit power level associated with the first initial access power configuration, and wherein receiving the response message comprises: receiving the response message that is transmitted by the UE using the second initial access power configuration.

Aspect 17: The method of any of Aspects 8-16, further comprising: determining the low power configuration for the UE based at least in part on the at least one low power capability of the UE or the location information of the UE; and transmitting, to the UE, an indication of the low power configuration.

Aspect 18: An apparatus for wireless communication at a device, comprising a processor; memory coupled with the processor; and instructions stored in the memory and executable by the processor to cause the apparatus to perform the method of one or more Aspects of Aspects 1-7.

Aspect 19: A device for wireless communication, comprising a memory and one or more processors coupled to the memory, the memory and the one or more processors configured to perform the method of one or more Aspects of Aspects 1-7.

Aspect 20: An apparatus for wireless communication, comprising at least one means for performing the method of one or more Aspects of Aspects 1-7.

Aspect 21: A non-transitory computer-readable medium storing code for wireless communication, the code comprising instructions executable by a processor to perform the method of one or more Aspects of Aspects 1-7.

Aspect 22: A non-transitory computer-readable medium storing a set of instructions for wireless communication, the set of instructions comprising one or more instructions that, when executed by one or more processors of a device, cause the device to perform the method of one or more Aspects of Aspects 1-7.

Aspect 23: An apparatus for wireless communication at a device, comprising a processor; memory coupled with the processor; and instructions stored in the memory and executable by the processor to cause the apparatus to perform the method of one or more Aspects of Aspects 8-17.

Aspect 24: A device for wireless communication, comprising a memory and one or more processors coupled to the memory, the memory and the one or more processors configured to perform the method of one or more Aspects of Aspects 8-17.

Aspect 25: An apparatus for wireless communication, comprising at least one means for performing the method of one or more Aspects of Aspects 8-17.

Aspect 26: A non-transitory computer-readable medium storing code for wireless communication, the code comprising instructions executable by a processor to perform the method of one or more Aspects of Aspects 8-17.

Aspect 27: A non-transitory computer-readable medium storing a set of instructions for wireless communication, the set of instructions comprising one or more instructions that, when executed by one or more processors of a device, cause the device to perform the method of one or more Aspects of Aspects 8-17.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors coupled to the memory, the one or more processors configured to:
       receive, from a wireless communication device, an acquisition signal that uses a lower transmit power level than a transmit power level of one or more other acquisition signals transmitted by the wireless communication device;
       transmit, to the wireless communication device, a response message to the acquisition signal, that uses an initial access power configuration associated with the acquisition signal, the response message indicating at least one low power capability of the UE or location information of the UE; and
       communicate, with the wireless communication device, in a connected communication mode using a low power configuration that is based at least in part on the at least one low power capability of the UE or the location information of the UE.

2. The UE of claim 1, wherein the one or more processors are configured to, when transmitting the response message, transmit at least one of:
    an uplink message,
    a sidelink message, or
    a random access channel message.

3. The UE of claim 1, wherein the one or more processors are configured to, when receiving the acquisition signal:
    receive an indication of a random access channel occasion associated with the acquisition signal and the initial access power configuration associated with the random access channel occasion,
    wherein the one or more processors, when transmitting the response message, are configured to:

transmit, during the random access channel occasion, the response message using the initial access power configuration.

4. The UE of claim 1, wherein the initial access power configuration indicates at least one of:
   one or more power control parameters to be used by the UE, or
   a physical random access channel (PRACH) waveform to be used by the UE, the PRACH waveform including at least one of a long PRACH preamble format or one or more repeated symbols to be included in the PRACH waveform.

5. The UE of claim 1, wherein the one or more processors are further configured to:
   receive an indication of the low power configuration and a different power configuration, the different power configuration being associated with a higher transmit power level than a transmit power level of the low power configuration; and
   receive an indication of one or more trigger events indicating when the UE is to switch from using the low power configuration to using the different power configuration.

6. The UE of claim 5, wherein the one or more processors are configured to, when receiving the indication of the low power configuration and the different power configuration:
   receive an indication of at least one of:
      a first closed loop power control parameter for the low power configuration and a second closed loop power control parameter for the different power configuration,
      a beamforming configuration for communications to be transmitted by the UE when using the low power configuration, or
      a sounding reference signal (SRS) configuration for uplink beam sweeping to be used by the UE when using the low power configuration.

7. The UE of claim 1, wherein the one or more processors are configured to, when transmitting the response message:
   transmit an indication of one or more low power capabilities of the UE or the location information of the UE that includes at least one of:
      a minimum transmit power level of the UE,
      a beamforming capability of the UE,
      an input range of an analog to digital converter of the UE,
      movement information of the UE, or
      location information of the UE,
   wherein the indication of one or more low power capabilities of the UE or the location information of the UE is explicitly indicated in the response message or implicitly indicated based at least in part on a random access channel occasion used to transmit the response message.

8. A wireless communication device for wireless communication, comprising:
   a memory; and
   one or more processors coupled to the memory, the one or more processors configured to:
      transmit a set of acquisition signals that includes a first subset of acquisition signals having a first transmit power level and a second subset of acquisition signals having a second transmit power level that is less than the first transmit power level;
      receive, from a user equipment (UE), a response message, that uses an initial access power configuration associated with an acquisition signal included in the second subset of acquisition signals, the response message indicating at least one low power capability of the UE or location information of the UE; and
      communicate, with the UE, in a connected communication mode using a low power configuration that is based at least in part on the at least one low power capability of the UE or the location information of the UE.

9. The wireless communication device of claim 8, wherein the one or more processors are configured to, when transmitting the set of acquisition signals, transmit at least one of:
   a synchronization signal block (SSB),
   a system information block (SIB),
   a random access channel message, or
   a sidelink message.

10. The wireless communication device of claim 8, wherein the one or more processors are configured to, when transmitting the set of acquisition signals:
    transmit the second subset of acquisition signals in an omni-directional transmission or without performing beam refinement.

11. The wireless communication device of claim 8, wherein the one or more processors are further configured to:
    refrain from scheduling a first message that is to be frequency division multiplexed with an acquisition signal, included in the second subset of acquisition signals, unless the first message uses the second transmit power level or a transmit power level that is within a first threshold amount of the second transmit power level; and
    refrain from scheduling a second message that is to be frequency division multiplexed with the response message unless the second message uses a transmit power level that is the same as, or is within a second threshold amount of, a transmit power level associated with the initial access power configuration.

12. The wireless communication device of claim 8, wherein the one or more processors are configured to, when transmitting the set of acquisition signals:
    transmit the second subset of acquisition signals including a third subset of acquisition signals, from the second subset of acquisition signals, and a fourth subset of acquisition signals, from the second subset of acquisition signals,
    wherein the third subset of acquisition signals and the fourth subset of acquisition signals are transmitted using different transmit power levels.

13. The wireless communication device of claim 8, wherein the at least one low power capability of the UE or the location information of the UE indicates at least one of:
    a minimum transmit power level of the UE,
    a beamforming capability of the UE,
    an input range of an analog to digital converter of the UE,
    movement information of the UE, or
    location information of the UE.

14. The wireless communication device of claim 8, wherein the one or more processors are further configured to:
    transmit, to the UE, an indication of one or more trigger events indicating when the UE is to switch from using the low power configuration to using a different power configuration, wherein the one or more trigger events include at least one of:

a movement or location trigger event,
an amount of time associated with the use of the low power configuration, or
a downlink measurement parameter trigger event.

15. The wireless communication device of claim 8, wherein the one or more processors are configured to, when communicating, with the UE, in the connected communication mode using the low power configuration:
   transmit, to the UE, one or more signals that use a transmit power level that is based at least in part on the at least one low power capability of the UE or the location information of the UE; or
   receive, from the UE, one or more signals that are transmitted by the UE using a transmit power level that is based at least in part on the at least one low power capability of the UE or the location information of the UE.

16. The wireless communication device of claim 8, wherein the one or more processors are configured to, when transmitting the set of acquisition signals:
   transmit the first subset of acquisition signals that are associated with a first set of random access channel (RACH) occasions, wherein the first set of RACH occasions are associated with a first initial access power configuration to be used by the UE; and
   transmit the second subset of acquisition signals that are associated with a second set of RACH occasions, wherein the second set of RACH occasions are associated with a second initial access power configuration to be used by the UE, wherein the second initial access power configuration is associated with a lower transmit power level than a transmit power level associated with the first initial access power configuration, and
   wherein the one or more processors are configured to, when receiving the response message:
      receive the response message that is transmitted by the UE using the second initial access power configuration.

17. The wireless communication device of claim 8, wherein the one or more processors are further configured to:
   determine the low power configuration for the UE based at least in part on the at least one low power capability of the UE or the location information of the UE; and
   transmit, to the UE, an indication of the low power configuration.

18. A method of wireless communication performed by a user equipment (UE), comprising:
   receiving, from a wireless communication device, an acquisition signal that uses a lower transmit power level than a transmit power level of one or more other acquisition signals transmitted by the wireless communication device;
   transmitting, to the wireless communication device, a response message to the acquisition signal, that uses an initial access power configuration associated with the acquisition signal, the response message indicating at least one low power capability of the UE or location information of the UE; and
   communicating, with the wireless communication device, in a connected communication mode using a low power configuration that is based at least in part on the at least one low power capability of the UE or the location information of the UE.

19. The method of claim 18, wherein receiving the acquisition signal comprises:
   receiving an indication of a random access channel occasion associated with the acquisition signal and the initial access power configuration associated with the random access channel occasion,
   wherein transmitting the response message comprises:
      transmitting, during the random access channel occasion, the response message using the initial access power configuration.

20. The method of claim 18, wherein the initial access power configuration indicates at least one of:
   one or more power control parameters to be used by the UE, or
   a physical random access channel (PRACH) waveform to be used by the UE, the PRACH waveform including at least one of a long PRACH preamble format or one or more repeated symbols to be included in the PRACH waveform.

21. The method of claim 18, further comprising:
   receiving an indication of the low power configuration and a different power configuration, the different power configuration being associated with a higher transmit power level than a transmit power level of the low power configuration; and
   receiving an indication of one or more trigger events indicating when the UE is to switch from using the low power configuration to using the different power configuration.

22. The method of claim 21, wherein receiving the indication of the low power configuration and the different power configuration comprises:
   receiving an indication of at least one of:
      a first closed loop power control parameter for the low power configuration and a second closed loop power control parameter for the different power configuration,
      a beamforming configuration for communications to be transmitted by the UE when using the low power configuration, or
      a sounding reference signal (SRS) configuration for uplink beam sweeping to be used by the UE when using the low power configuration.

23. The method of claim 18, wherein transmitting the response message comprises:
   transmitting an indication of the at least one low power capability of the UE or the location information of the UE that includes at least one of:
      a minimum transmit power level of the UE,
      a beamforming capability of the UE,
      an input range of an analog to digital converter of the UE,
      movement information of the UE, or
      location information of the UE,
   wherein the indication of one or more low power capabilities of the UE or the location information of the UE is explicitly indicated in the response message or implicitly indicated based at least in part on a random access channel occasion used to transmit the response message.

24. A method of wireless communication performed by a wireless communication device, comprising:
   transmitting a set of acquisition signals that includes a first subset of acquisition signals having a first transmit power level and a second subset of acquisition signals having a second transmit power level that is less than the first transmit power level;
   receiving, from a user equipment (UE), a response message, that uses an initial access power configuration associated with an acquisition signal included in the second subset of acquisition signals, the response message indicating at least one power capability of the UE or location information of the UE; and communicating, with the UE, in a connected communication mode using a low power configuration that is based at least in part on the at least one low power capability of the UE or the location information of the UE.

25. The method of claim 24, further comprising:
refraining from scheduling a first message that is to be frequency division multiplexed with an acquisition signal, included in the second subset of acquisition signals, unless the first message uses the second transmit power level or a transmit power level that is within a first threshold amount of the second transmit power level; and refraining from scheduling a second message that is to be frequency division multiplexed with the response message unless the second message uses a transmit power level that is the same as, or is within a second threshold amount of, a transmit power level associated with the initial access power configuration.

26. The method of claim 24, wherein transmitting the set of acquisition signals comprises:
transmitting the second subset of acquisition signals including a third subset of acquisition signals, from the second subset of acquisition signals, and a fourth subset of acquisition signals, from the second subset of acquisition signals, wherein the third subset of acquisition signals and the fourth subset of acquisition signals are transmitted using different transmit power levels.

27. The method of claim 24, wherein the at least one low power capability of the UE or the location information of the UE indicates at least one of:
a minimum transmit power level of the UE,
a beamforming capability of the UE,
an input range of an analog to digital converter of the UE,
movement information of the UE, or
location information of the UE.

28. The method of claim 24, further comprising:
transmitting, to the UE, an indication of one or more trigger events indicating when the UE is to switch from using the low power configuration to using a different power configuration, wherein the one or more trigger events include at least one of:
a movement or location trigger event,
an amount of time associated with the use of the low power configuration, or
a downlink measurement parameter trigger event.

29. The method of claim 24, wherein communicating, with the UE, in the connected communication mode using the low power configuration comprises at least one of:
transmitting, to the UE, one or more signals that use a transmit power level that is based at least in part on the at least one low power capability of the UE or the location information of the UE; or
receiving, from the UE, one or more signals that are transmitted by the UE using a transmit power level that is based at least in part on the at least one low power capability of the UE or the location information of the UE.

30. The method of claim 24, wherein transmitting the set of acquisition signals comprises:
transmitting the first subset of acquisition signals that are associated with a first set of random access channel (RACH) occasions, wherein the first set of RACH occasions are associated with a first initial access power configuration to be used by the UE; and
transmitting the second subset of acquisition signals that are associated with a second set of RACH occasions, wherein the second set of RACH occasions are associated with a second initial access power configuration to be used by the UE, wherein the second initial access power configuration is associated with a lower transmit power level than a transmit power level associated with the first initial access power configuration, and wherein receiving the response message comprises:
receiving the response message that is transmitted by the UE using the second initial access power configuration.

* * * * *